(12) United States Patent
Cheung et al.

(10) Patent No.: US 7,269,452 B2
(45) Date of Patent: Sep. 11, 2007

(54) DIRECTIONAL WIRELESS COMMUNICATION SYSTEMS

(75) Inventors: Kwok Wai Cheung, Hong Kong (HK); Peter P. Tong, Mountain View, CA (US); C. Douglass Thomas, Campbell, CA (US)

(73) Assignee: IpVenture, Inc., Los Altos, CA (US)

( * ) Notice: Subject to any disclaimer, the term of this patent is extended or adjusted under 35 U.S.C. 154(b) by 546 days.

(21) Appl. No.: 10/826,529

(22) Filed: Apr. 15, 2004

(65) Prior Publication Data

US 2005/0009583 A1    Jan. 13, 2005

Related U.S. Application Data

(60) Provisional application No. 60/493,441, filed on Aug. 8, 2003, provisional application No. 60/469,221, filed on May 12, 2003, provisional application No. 60/462,570, filed on Apr. 15, 2003.

(51) Int. Cl.
*H04M 1/00* (2006.01)

(52) U.S. Cl. .............................. 455/575.6; 455/569.1; 455/556.1; 455/557

(58) Field of Classification Search ............. 455/90.3, 455/575.6, 569.1, 66.1, 550.1, 556.1, 566, 455/422.1, 100, 344, 41.2; 381/381, 312, 381/315

See application file for complete search history.

(56) References Cited

U.S. PATENT DOCUMENTS

| | | | |
|---|---|---|---|
| 3,974,335 A | | 8/1976 | Blackledge |
| 4,128,738 A | * | 12/1978 | Gallery ........................ 381/335 |
| 4,622,440 A | | 11/1986 | Slavin |
| 4,823,908 A | | 4/1989 | Tanaka |
| 4,955,729 A | | 9/1990 | Marx |
| 5,313,663 A | | 5/1994 | Norris |
| 5,321,758 A | | 6/1994 | Charpentier et al. |
| 5,357,578 A | | 10/1994 | Taniishi |
| 5,526,411 A | * | 6/1996 | Krieter ................... 379/110.01 |
| 5,572,575 A | | 11/1996 | Yamamoto et al. |
| 5,648,824 A | | 7/1997 | Dunn et al. |

(Continued)

OTHER PUBLICATIONS

PCT International Search Report, RE: PCT/US04/11972, Jan. 31, 2005.

(Continued)

*Primary Examiner*—Matthew Anderson
*Assistant Examiner*—Tan Trinh

(57) ABSTRACT

A wireless communication system based on a directional speaker is disclosed. The system can include an interface unit and a base unit. The audio signals from the speaker can be generated by transforming ultrasonic signals in air. This allows the production of directional audio signals even when the aperture of the speaker has dimensions in the order of a few centimeters. The audio signals from the speaker can be heard hands-free. Further, privacy protection is enhanced. In one embodiment, the interface unit can be attached or integrated to a piece of clothing at the shoulder of the user, with the audio signals from the speaker directed towards one of the user's ears. The wireless communication system can be applied to a number of different areas, including a communication device, such as a cell phone; a hearing aid; an entertainment system; and a computation system, such as a personal digital assistant or a computer. The wireless communication system can be personalized to the hearing characteristics of the user, or to the ambient noise level of the environment.

23 Claims, 15 Drawing Sheets

U.S. PATENT DOCUMENTS

| 5,793,875 | A | | 8/1998 | Lehr et al. | |
|---|---|---|---|---|---|
| 5,802,190 | A | | 9/1998 | Ferren | |
| 5,819,183 | A | * | 10/1998 | Voroba et al. | 455/570 |
| 5,828,768 | A | * | 10/1998 | Eatwell et al. | 381/333 |
| 5,835,732 | A | | 11/1998 | Kikinis et al. | |
| 5,943,430 | A | | 8/1999 | Saitoh | |
| 6,011,855 | A | | 1/2000 | Selfridge et al. | |
| 6,058,315 | A | | 5/2000 | Clark | |
| 6,086,541 | A | | 7/2000 | Rho | |
| 6,151,398 | A | * | 11/2000 | Norris | 381/77 |
| 6,169,813 | B1 | | 1/2001 | Richardson et al. | |
| 6,243,742 | B1 | | 6/2001 | Hagersten et al. | |
| 6,275,596 | B1 | | 8/2001 | Fretz et al. | |
| 6,322,521 | B1 | | 11/2001 | Hou | |
| 6,363,139 | B1 | | 3/2002 | Zurek et al. | |
| 6,445,804 | B1 | | 9/2002 | Hirayanagi | |
| 6,453,045 | B1 | | 9/2002 | Zurek et al. | |
| 6,477,258 | B1 | | 11/2002 | Watson et al. | |
| 6,496,205 | B1 | | 12/2002 | White et al. | |
| 6,535,612 | B1 | | 3/2003 | Croft, III et al. | |
| 6,584,205 | B1 | | 6/2003 | Croft, III et al. | |
| 6,631,196 | B1 | | 10/2003 | Taenzer et al. | |
| 6,643,377 | B1 | | 11/2003 | Takahashi et al. | |
| 6,650,755 | B2 | | 11/2003 | Vaudrey et al. | |
| 6,895,261 | B1 | * | 5/2005 | Palamides | 455/575.6 |
| 7,013,009 | B2 | * | 3/2006 | Warren | 379/420.01 |
| 2001/0055397 | A1 | | 12/2001 | Norris et al. | |
| 2002/0012441 | A1 | * | 1/2002 | Matsunaga et al. | 381/381 |
| 2002/0048382 | A1 | | 4/2002 | Hou | |
| 2002/0048385 | A1 | | 4/2002 | Rosenberg | |
| 2002/0054689 | A1 | | 5/2002 | Zhang et al. | |
| 2002/0090099 | A1 | * | 7/2002 | Hwang | 381/312 |
| 2002/0090103 | A1 | | 7/2002 | Calisto, Jr. | |
| 2002/0183648 | A1 | | 12/2002 | Hou | |
| 2002/0191807 | A1 | * | 12/2002 | Asada et al. | 381/335 |
| 2003/0035552 | A1 | | 2/2003 | Kolano et al. | |
| 2003/0091200 | A1 | | 5/2003 | Pompei | |
| 2003/0092377 | A1 | | 5/2003 | Hill | |
| 2003/0118198 | A1 | | 6/2003 | Croft, III et al. | |
| 2003/0182104 | A1 | | 9/2003 | Muesch | |
| 2004/0202339 | A1 | | 10/2004 | O'Brien, Jr. et al. | |
| 2004/0204168 | A1 | * | 10/2004 | Laurila | 455/569.1 |

OTHER PUBLICATIONS

PCT Written Opinion of the International Searching Authority, RE: PCT/US04/11972, Jan. 31, 2005.

"Audio Spotlight—Put sound where you want it," Holosonic Research Labs, Inc., 2002, www.holosonics.com/technology.html (downloaded Jan. 18, 2004).

"Technology Introduction," American Technology Corporation, 2001, pp. 1-19.

"Technology Licensing— HyperSonic Sound," American Technology Corporation, 2003, pp. 1-3.

"Theory, History, and the Advancement of Parametric Loudspeakers—A Technology Overview," White Paper, American Technology Corporation, 2002, pp. 1-27.

"HSS Directed Audio Sound System, Model Series: 220," Product Information, American Technology Corporation, 2003.

A. C. Baker, "Nonlinear pressure fields due to focused circular apertures," The Journal of the Acoustical Society of America, 91(2), Feb. 1992, pp. 713-717.

A.L. Vyas et al., "Design Considerations of Parametric Arrays," IEEE Proceedings of the 1998 International Symposium on Underwater Technology, Apr. 15-17, 1998, pp. 98-102.

B. G. Lucas et al., "Field of a parametric focusing source," The Journal of the Acoustical Society of America,73 (6), Jun. 1983, pp. 1966-1971.

B.G. Lucas et al., The field of focusing source, The Journal of the Acoustical Society of America, 72(4), Oct. 1982, pp. 1289-1296.

B.W. Lawton, "Damage to human hearing by airborne sound of a very high frequency or ultrasonic frequency," Institute of Sound and Vibration Research, Contract Research Report 343/2001, 2001, pp. 1-77.

C. M. Darvennes et al., "Scattering of sound by sound from two Gaussian beams," The Journal of the Acoustical Society of America, 87(5), May 1990, pp. 1955-1964.

C.M. Darvennes et al., "Effects of absorption on the nonlinear interaction of sound beams," The Journal of the Acoustical Society of America, 89(3), Mar. 1991, pp. 1028-1036.

D. Marculescu et al., "Ready to Ware," IEEE Spectrum, Oct. 2003, pp. 28-32.

D.I. Havelock, "Directional Loudspeakers Using Sound Beams," J. Audio Eng. Soc., vol. 48, No. 10, Oct. 2000, pp. 908-916.

E.A. Zabolotskaya et al., "Quasi-plane Waves in the Nonlinear Acoustics of Confined Beams," Soviet Physics-Acoustics, vol. 15, No. 1, Jul.-Sep. 1969, pp. 35-40.

F.J. Pompei, "The Use of Airborne Ultrasonics for Generating Audible Sound Beams," J. Audio Eng. Soc., vol. 47, No. 9, Sep. 1999, pp. 726-731.

G. Garrett et al., "Nearfield of a large acoustic transducer, Part II: Parametric radiation," The Journal of the Acoustical Society of America, 74(3), Sep. 1983, pp. 1013-1020.

G. Garrett et al., "Nearfield of a large acoustic transducer. Part III: General results," The Journal of the Acoustical Society of America, 75(3), Mar. 1984, pp. 769-779.

H.O. Berktay, "Possible Exploitation of Non-Linear Acoustics in Underwater Transmitting Applications," J. Sound Vib. (1965) 2(4), 435-461.

i60c Phone User's Guide, Nextel Communications, 2002, pp. 6, 65, 66, 135-137.

J. Bernsten et al., Interaction of sound waves. Part IV: Scattering of sound by sound, The Journal of the Acoustical Society of America , 86(5), Nov. 1989, pp. 1968-1983.

J. Bernsten et al., "Nearfield of a large acoustic transducer. Part IV: Second harmonic and sum frequency radiation," The Journal of the Acoustical Society of America, 75(5), May 1984, pp. 1383-1391.

J. Meyer, "Microphone Array for Hearing Aids taking into Account the Scattering of the Head," 2001 IEEE Workshop on Applications of Signal Processing to Audio and Acoustics, Oct. 21-24, 2001, pp. 27-30.

J. N. Tjotta et al., "Propagation and interaction of two collinear finite amplitude sound beams," The Journal of the Acoustical Society of America, 88(6), Dec. 1990, pp. 2859-2870.

J. Zemanek, "Beam Behaviour within the Nearfield of a Vibrating Piston," The Journal of the Acoustical Society of America, vol. 42, No. 1 (Part 2), 1971, pp. 181-191.

K. Aoki et al., "Parametric Loudspeaker-Applied Examples," Electronics and Communications in Japan, Part 3, vol. 77, No. 1, 1994, pp. 64-74.

K. Maney, "Sound technology turns the way you hear on its ear," USA Today, May 2003, pp. 1-4.

M. Greenspan, "Piston radiator: Some extensions of the theory," The Journal of the Acoustical Society of America, 65(3), Mar. 1979, pp. 608-621.

M. Yoneyama et al., "The audio spotlight: An application of nonlinear interaction of sound waves to a new type of loudspeaker design," The Journal of the Acoustical Society of America , 73(5), May 1983, pp. 1532-1536.

M.A. Averkiou et al., "Self-demodulation of amplitude- and frequency-modulated pulses in a thermoviscous fluid," The Journal of the Acoustical Society of America , 94(5), Nov. 1993, pp. 2876-2883.

M.B. Bennett et al., "Parametric array in air," The Journal of the Acoustical Society of America, vol. 57, No. 3, Mar. 1975, pp. 562-568.

Nextel i60c Phone Details, http://nextelonline.nextel.com, downloaded Apr. 22, 2003, pp. 1-2.

Nextel-Direct Connect, http://nextelonline.nextel.com/services/directconnect-popup.html, downloaded Apr. 22, 2003, p. 1.

P.J. Westervelt, "Parametric Acoustic Array," The Journal of the Acoustical Society of America, vol. 35, No. 4, Apr. 1963, pp. 535-537.

Palm™ m515 Handheld, Palm Store of Yahoo! Shopping, downloaded Apr. 23, 2003, pp. 1-2.

Palm™ PalmModem® Connectivity Kit, Plam Store of Yahoo! Shopping, downloaded Apr. 23, 2003, pp. 1-2.

Palm™ Tungsten™ C Handheld, Palm Store of Yahoo! Shopping, downloaded Apr. 23, 2003, pp. 1-3.

Palm™ Zire™ 71 Handheld, Palm Store of Yahoo! Shopping, downloaded Apr. 23, 2003, pp. 1-3.

T. Kamakura et al., "Suitable Modulation of the Carrier Ultrasound for a Parametric Loudspeaker," ACUSTICA, vol. 73 (1991), pp. 215-217.

T. Kamakura et al., "Harmonic generation in finite amplitude sound beams from a rectangular aperture source," The Journal of the Acoustical Society of America, 91(6), Jun. 1992, pp. 3144-3151.

T. Kamakura et al., "Nonlinearly generated spectral components in the nearfield of a directive sound source," The Journal of the Acoustical Society of America, 85(6), Jun. 1989, pp. 2331-2337.

T.D. Kite et al., "Parametric Array in Air: Distortion Reduction by Preprocessing," Proceedings of the 16th International Congress on Acoustics and the 135th Meeting of the Acoustical Society of America, Seattle, WA, Jun. 1998, pp. 1091-1092.

T.G. Muir et al., "Parametric Acoustic Transmitting Arrays," The Journal of the Acoustical Society of America, vol. 52, No. 5, Part 2, 1972, pp. 1481-1486.

V.P. Kuznetsov, "Equations of Nonlinear Acoustics," Soviet Physics-Acoustics, vol. 16, No. 4, Apr.-Jun. 1971, pp. 467-470.

W.F. Druyvesteyn et al., "Personal Sound," J. Audio Eng. Soc., vol. 45, No. 9, Sep. 1997, pp. 685-701.

Y.W. Kim et al., "Novel Preprocessing Technique to Improve Harmonic Distortion in Airborne Parametric Array," ICSP '02 Proceedings, pp. 1815-1818.

Z.A. Gol'dberg, "Certain Second-Order Quantities in Acoustics," Sov Phys Acoust, vol. 3, 1957, pp. 157-162.

* cited by examiner

DIRECTIONAL WIRELESS COMMUNICATION SYSTEMS

CROSS-REFERENCE TO RELATED APPLICATIONS

This application claims priority of: (i) U.S. Provisional Patent Application No. 60/462,570, filed Apr. 15, 2003, and entitled "WIRELESS COMMUNICATION SYSTEMS OR DEVICES, HEARING ENHANCEMENT SYSTEMS OR DEVICES, AND METHODS THEREFORE," which is hereby incorporated herein by reference; (ii) U.S. Provisional Patent Application No. 60/469,221, filed May 12, 2003, and entitled "WIRELESS COMMUNICATION SYSTEMS OR DEVICES, HEARING ENHANCEMENT SYSTEMS OR DEVICES, DIRECTIONAL SPEAKER FOR ELECTRONIC DEVICE, PERSONALIZED AUDIO SYSTEMS OR DEVICES, AND METHODS THEREFORE," which is hereby incorporated herein by reference; and (iii) U.S. Provisional Patent Application No. 60/493,441, filed Aug. 8, 2003, and entitled "WIRELESS COMMUNICATION SYSTEMS OR DEVICES, HEARING ENHANCEMENT SYSTEMS OR DEVICES, DIRECTIONAL SPEAKER FOR ELECTRONIC DEVICE, AUDIO SYSTEMS OR DEVICES, WIRELESS AUDIO DELIVERY, AND METHODS THEREFORE," which is hereby incorporated herein by reference.

This application is also related to: (i) U.S. patent application Ser. No. 10/826,527, filed concurrently, and entitled, "DIRECTIONAL HEARING ENHANCEMENT SYSTEMS." which is hereby incorporated herein by reference; (ii) U.S. patent application Ser. No. 10/826,531, filed concurrently, and entitled, "DIRECTIONAL SPEAKER FOR PORTABLE ELECTRONIC DEVICE," which is hereby incorporated herein by reference; (iii) U.S. patent application Ser. No. 10/826,537, filed concurrently, and entitled, "METHOD AND APPARATUS FOR LOCALIZED DELIVERY OF AUDIO SOUND FOR ENHANCED PRIVACY," which is hereby incorporated herein by reference; and (iv) U.S. patent application Ser. No. 10/826,528, filed concurrently, and entitled, "METHOD AND APPARATUS FOR WIRELESS AUDIO DELIVERY," which is hereby incorporated herein by reference.

BACKGROUND OF THE INVENTION

1. Filed of the Invention

The present invention relates generally to a wireless communication system, and more particularly, to a directional wireless communication system.

2. Description of the Related Art

Cell phones and other wireless communication systems have become an integral part of our lives. During the early $20^{th}$ Century, some predicted that if phone companies continued with their growth rate, everyone would become a phone operator. From a certain perspective, this prediction has actually come true. Cell phones have become so prevalent that many of us practically cannot live without them. As such, we might have become cell phone operators.

However, the proliferation of cell phones has brought on its share of headaches. The number of traffic accidents has increased due to the use of cell phones while driving. The increase is probably due to drivers taking their hands off the steering wheel to engage in phone calls. Instead of holding onto the steering wheel with both hands, one of the driver's hands may be holding a cell phone. Or, even worse, one hand may be holding a phone and the other dialing it. The steering wheel is left either unattended, or, at best, maneuvered by the driver's thighs!

Another disadvantage of cell phones is that they might cause brain tumors. With a cell phone being used so close to one's brain, there are rumors that the chance of getting a brain tumor is increased. One way to reduce the potential risk is to use an earpiece or headset connected to the cell phone.

Earpieces and headsets, however, can be quite inconvenient. Imagine your cell phone rings. You pick up the call but then you have to tell the caller to hold while you unwrap and extend the headset wires, plug the headset to the cell phone, and then put on the headset. This process is inconvenient to both the caller, who has to wait, and to you, as you fumble around to coordinate the use of the headset. Also, many headsets require earpieces. Having something plugged into one's ear is not natural and is annoying to many, especially for long phone calls. Further, if you are jogging or involved in a physical activity, the headset can get dislodged or detached.

It should be apparent from the foregoing that there is still a need for improved ways to enable wireless communication systems to be used hands-free.

SUMMARY

The present invention provides a wireless communication system that has a directional speaker. In one embodiment, with the speaker appropriately attached or integral to a user's clothing, the user can receive audio signals from the speaker hands-free. The audio-signals from the speaker are directional, allowing the user to hear the audio signals without requiring an earpiece, while providing certain degree of privacy protection.

The wireless communication system can be a phone. In one embodiment, the system has a base unit coupled to an interface unit. The interface unit includes a directional speaker and a microphone. Audio signals are generated by transforming directional ultrasonic signals (output by the directional speaker) with air. In one embodiment, the interface unit can be attached to the shoulder of the user, and the audio signals from the speaker can be directed towards one of the user's ears.

The interface unit can be coupled to the base unit through a wired or wireless connection. The base unit can also be attached to the clothing of the user.

The phone, particularly a cell phone, can be a dual-mode phone. One mode is the hands-free mode phone. The other mode is the normal mode, where the audio signals are generated directly from the speaker.

The interface unit can include two speakers, each located on, or proximate to, a different shoulder of the user. The microphone can also be separate from, and not integrated to, the speaker.

In one embodiment, the speaker can be made of one or more devices that can be piezoelectric thin-film devices, bimorph devices or magnetic transducers. Multiple devices can be arranged to form a blazed grating, with the orthogonal direction of the grating pointed towards the ear. Multiple devices can also be used to form a phase array, which can generate an audio beam that has higher directivity and is steerable.

In another embodiment, the wireless communication system can be used as a hearing aid. The system can also be both a cell phone and a hearing aid, depending on whether there is an incoming call.

In still another embodiment, the interface unit does not have a microphone, and the wireless communication system can be used as an audio unit, such as a CD player. The interface unit can also be applicable for playing video games, watching television or listening to a stereo system. Due to the directional audio signals, the chance of disturbing people in the immediate neighborhood is significantly reduced.

In yet another embodiment, the interface unit is integrated with the base unit. The resulting wireless communication system can be attached to the clothing of the user, with its audio signals directed towards one ear of the user.

In another embodiment, the base unit includes the capability to serve as a computation system, such as a personal digital assistant (PDA) or a portable computer. This allows the user to simultaneously use the computation system (e.g. PDA) as well as making phone calls. The user does not have to use his hand to hold a phone, thus freeing both hands to interact with the computation system. In another approach for this embodiment, the directional speaker is not attached to the clothing of the user, but is integrated to the base unit. The base unit can also be enabled to be connected wirelessly to a local area network, such as to a WiFi or WLAN network, which allows high-speed data as well as voice communication with the network.

In still another embodiment, the wireless communication system is personalized to the hearing characteristics of the user, or is personalized to the ambient noise level in the vicinity of the user.

Other aspects and advantages of the present invention will become apparent from the following detailed description, which, when taken in conjunction with the accompanying drawings, illustrates by way of example the principles of the invention.

Same numerals in FIGS. 1-13 are assigned to similar elements in all the figures. Embodiments of the invention are discussed below with reference to FIGS. 1-13. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
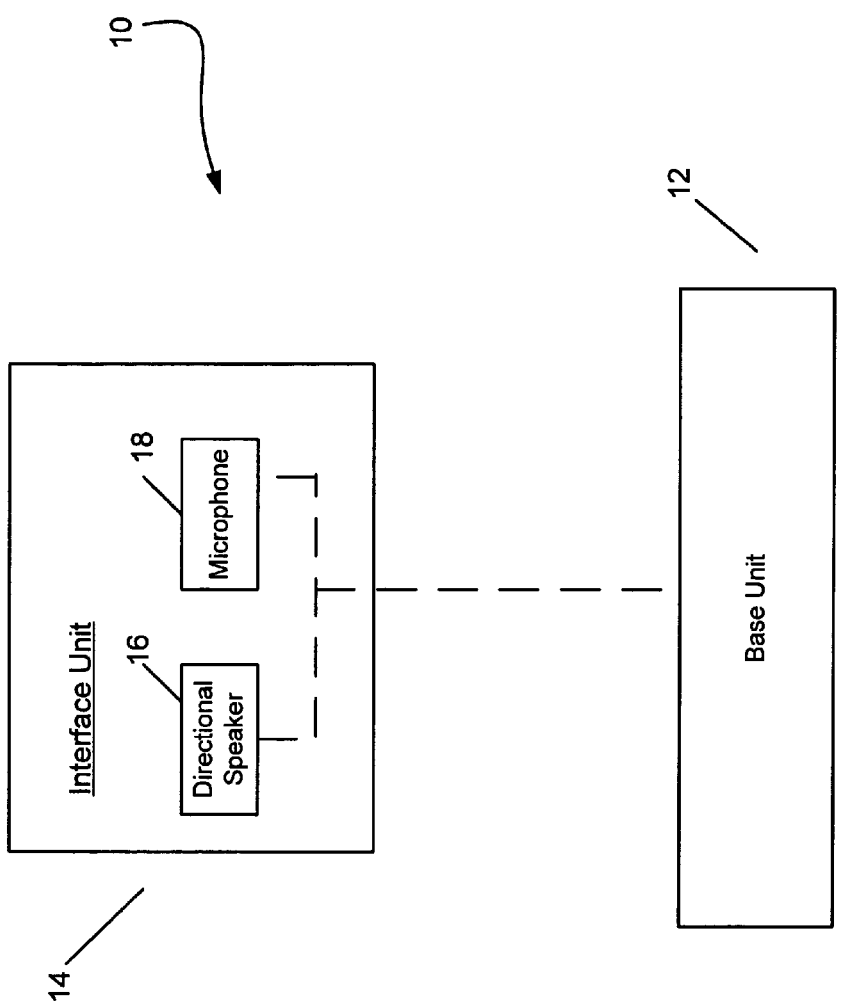
FIG. 1 shows one embodiment of the invention with a base unit coupled to a directional speaker and a microphone.

One embodiment of the present invention is a wireless communication system that provides improved hands-free usage. The wireless communication system can, for example, be a mobile phone. FIG. 1 shows a block diagram of wireless communication system 10 according to one embodiment of the invention. The wireless communication system 10 has a base unit 12 that is coupled to an interface unit 14. The interface unit 14 includes a directional speaker 16 and a microphone 18. The directional speaker 16 generates directional audio signals.

From basic aperture antenna theory, the angular beam width $\theta$ of a source, such as the directional speaker, is roughly $\lambda/D$, where $\theta$ is the angular full width at half-maximum (FWHM), $\lambda$ is the wavelength and D is the diameter of the aperture. For simplicity, assume the aperture to be circular.

For ordinary audible signals, the frequency is from a few hundred hertz, such as 500 Hz, to a few thousand hertz, such as 5000 Hz. With the speed of sound in air c being 340 m/s, $\lambda$ of ordinary audible signals is roughly between 70 cm and 7 cm. For personal or portable applications, the dimension of a speaker can be in the order of a few cm. Given that the acoustic wavelength is much larger than a few cm, such a speaker is almost omni-directional. That is, the sound source is emitting energy almost uniformly at all directions. This can be undesirable if one needs privacy because an omni-directional sound source means that anyone in any direction can pickup the audio signals.

To increase the directivity of the sound source, one approach is to decrease the wavelength of sound, but this can put the sound frequency out of the audible range. Another technique is known as parametric acoustics.

Parametric acoustic operation has previously been discussed, for example, in the following publications: "Parametric Acoustic Array," by P. J. Westervelt, in J., Acoust. Soc. Am., Vol. 35 (4), pp. 535-537, 1963; "Possible exploitation of Non-Linear Acoustics in Underwater Transmitting Applications," by H. O. Berktay, in J. Sound Vib. Vol. 2 (4): 435-461 (1965); and "Parametric Array in Air," by Bennett et al., in J. Acoust. Soc. Am., Vol. 57 (3), pp. 562-568, 1975.

In one embodiment, assume that the audible acoustic signal is f(t) where f(t) is a band-limited signal, such as from 500 to 5,000 Hz. A modulated signal $f(t) \sin \omega_c t$ is created to drive an acoustic transducer. The carrier frequency $\omega_c/2\pi$ should be much larger than the highest frequency component of f(t). In an example, the carrier wave is an ultrasonic wave. The acoustic transducer should have a sufficiently wide bandwidth at $\omega_c$ to cover the frequency band of the incoming signal f(t). After this signal f(t) sin $\omega_c$ t is emitted from the transducer, non-linear demodulation occurs in air, creating an audible signal, E(t), where $$E(t) \propto \partial^2/\partial t^2 [f^2(\tau)]$$

with $\tau$=t−L/c, and L being the distance between the source and the receiving ear. In this example, the demodulated audio signal is proportional to the second time derivative of the square of the modulating envelope f(t).

To retrieve the audio signal f(t) more accurately, a number of approaches pre-process the original audio signals before feeding them into the transducer. Each has its specific attributes and advantages. One pre-processing approach is disclosed in "Acoustic Self-demodulation of Pre-distorted Carriers," by B. A. Davy, Master's Thesis submitted to U.T. Austin in 1972. The disclosed technique integrates the signal f(t) twice, and then square-roots the result before multiplying it with the carrier sin $\omega_c$ t. The resultant signals are applied to the transducer. In doing so, an infinite harmonics of f(t) could be generated, and a finite transmission bandwidth can create distortion.

Another pre-processing approach is described in "The audio spotlight: An application of nonlinear interaction of sound waves to a new type of loudspeaker design," by Yoneyama et al., Journal of the Acoustic Society of America, Vol. 73 (5), pp. 1532-1536, May 1983. The pre-processing scheme depends on double side-band (DSB) modulation. Let S(t)=1+m f(t), where m is the modulation index. S(t) sin $\omega_c$ t is used to drive the acoustic transducer instead of f(t) sin $\omega_c$ t. Thus, $$E(t) \propto \partial^2/\partial t^2 [S^2(\tau)] \propto 2m\ f(\tau) + m^2 \partial^2/\partial t^2 [f(\tau)^2].$$

The first term provides the original audio signal. But the second term can produce undesirable distortions as a result of the DSB modulation. One way to reduce the distortions is by lowering the modulation index m. However, lowering m may also reduce the overall power efficiency of the system.

In "Development of a parametric loudspeaker for practical use," Proceedings of $10^{th}$ International Symposium on Non-linear Acoustics, pp. 147-150, 1984, Kamakura et al. introduced a pre-processing approach to remove the undesirable terms. It uses a modified amplitude modulation (MAM) technique by defining S(t)=$[1+m\ f(t)]^{1/2}$. That is, the demodulated signal E(t)∝m f(t). The square-rooted envelope operation of the MAM signal can broaden the bandwidth of S(t), and can require an infinite transmission bandwidth for distortion-free demodulation.

In "Suitable Modulation of the Carrier Ultrasound for a Parametric Loudspeaker," Acoustica, Vol. 23, pp. 215-217, 1991, Kamakura et al. introduced another pre-processing scheme, known as "envelope modulation". In this scheme, S(t)=$[e(t)+m\ f(t)]^{1/2}$ where e(t) is the envelope of f(t). The transmitted power was reduced by over 64% using this scheme and the distortion was better than the DSB or single-side band (SSB) modulation, as described in "Self-demodulation of a plane-wave—Study on primary wave modulation for wideband signal transmission," by Aoki et al., J. Acoust. Soc. Jpn., Vol. 40, pp. 346-349, 1984.

Back to directivity, the modulated signals, S(t) sin $\omega_c$ t or f(t) sin $\omega_c$ t, have a better directivity than the original acoustic signal f(t), because $\omega_c$ is higher than the audible frequencies. As an example, $\omega_c$ can be $2\pi$*40 kHz, though experiment has shown that $\omega_c$ can range from $2\pi$*20 kHz to well over $2\pi$*1 MHz. Typically, $\omega_c$ is chosen not to be too high because of the higher acoustic absorption at higher carrier frequencies. Anyway, with $\omega_c$ being $2\pi$*40 kHz, the modulated signals have frequencies that are approximately ten times higher than the audible frequencies. This makes an emitting source with a small aperture, such as 2.5 cm in diameter, a directional device for a wide range of audio signals.

In one embodiment, choosing a proper working carrier frequency $\omega_c$ takes into consideration a number of factors, such as:

1. To reduce the acoustic attenuation, which is generally proportional to $\omega_c$, the carrier frequency $\omega_c$ should not be high.
2. The FWHM of the ultrasonic beam should be large enough, such as 25 degrees, to accommodate head motions of the person wearing the portable device and to reduce the ultrasonic intensity through beam expansion.
3. To avoid the near-field effect which may cause amplitude fluctuations, the distance between the emitting device and the receiving ear r should be greater than 0.3*$R_0$, where $R_0$ is the Rayleigh distance, and is defined as (the area of the emitting aperture/$\lambda$). As an example, with FWHM being 20 degrees, $$\theta = \lambda/D = (c2\pi/\omega_c)/D \sim 1/3.$$

Assuming D is 2.5 cm, $\omega_c$ becomes $2\pi$*40 kHz. From this relation, it can be seen that the directivity of the ultrasonic beam can be adjusted by changing the carrier frequency $\omega_c$. If a smaller aperture acoustic transducer is preferred, the directivity may decrease. Note also that the power generated by the acoustic transducer is typically proportional to the aperture area. In the above example, the Rayleigh distance $R_0$ is about 57 mm.

Based on the above description, in one embodiment, directional audio signals can be generated by the speaker 16 even with a relatively small aperture through modulated ultrasonic signals. The modulated signals can be demodulated in air to regenerate the audio signals. The speaker 16 can then generate directional audio signals even when emitted from an aperture that is in the order of a few centimeters. This allows the directional audio signals to be pointed at desired directions.

Note that a number of examples have been described on generating audio signals through demodulating ultrasonic signals. However, the audio signals can also be generated through mixing two ultrasonic signals whose difference frequencies are the audio signals.

Figure 2:
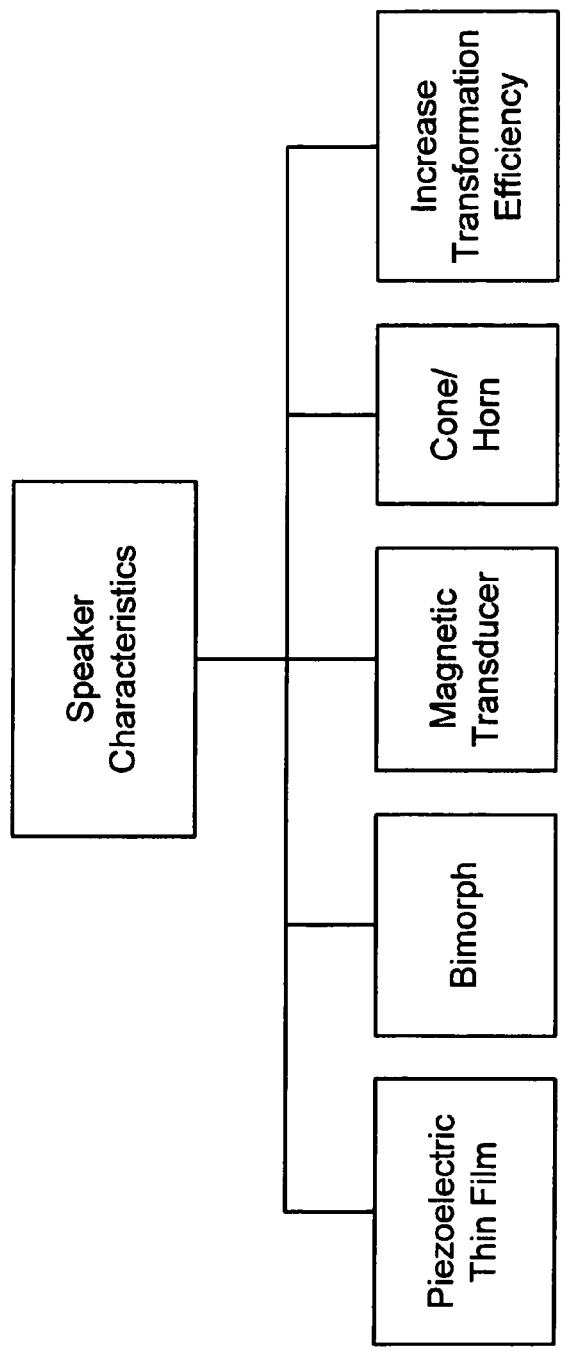
FIG. 2 shows examples of characteristics of a directional speaker of the present invention.

FIG. 2 shows examples of characteristics of a directional speaker. The directional speaker can, for example, be the directional speaker 16 illustrated in FIG. 1. The directional speaker can use a piezoelectric thin film. The piezoelectric thin film can be deposited on a plate with many cylindrical tubes. An example of such a device is described in U.S. Pat. No. 6,011,855, which is hereby incorporated by reference. The film can be a polyvinylidiene di-fluoride (PVDF) film, and can be biased by metal electrodes. The film can be attached or glued to the perimeter of the plate of tubes. The total emitting surfaces of all of the tubes can have a dimension in the order of a few wavelengths of the carrier or ultrasonic signals. Appropriate voltages applied through the electrodes to the piezoelectric thin film create vibrations of the thin film to generate the modulated ultrasonic signals.

These signals cause resonance of the enclosed tubes. After emitted from the film, the ultrasonic signals self-demodulate through non-linear mixing in air to produce the audio signals.

As one example, the piezoelectric film can be about 28 microns in thickness; and the tubes can be %4" in diameter and spaced apart by 0.16", from center to center of the tube, to create a resonating frequency of around 40 kHz. With the ultrasonic signals being centered around 40 kHz, the emitting surface of the directional speaker can be around 2 cm by 2 cm. A significant percentage of the ultrasonic power generated by the directional speaker can, in effect, be confined in a cone.

To calculate the amount of power within the cone, for example, as a rough estimation, assume that (a) the emitting surface is a uniform circular aperture with the diameter of 2.8 cm, (b) the wavelength of the ultrasonic signals is 8.7 mm, and (c) all power goes to the forward hemisphere, then the ultrasonic power contained within the FWHM of the main lobe is about 97%, and the power contained from null to null of the main lobe is about 97.36%. Similarly, again as a rough estimation, if the diameter of the aperture drops to 1 cm, the power contained within the FWHM of the main lobe is about 97.2%, and the power contained from null to null of the main lobe is about 99%.

Referring back to the example of the piezoelectric film, the FWHM of the signal beam is about 24 degrees. Assume that such a directional speaker 16 is placed on the shoulder of a user. The output from the speaker can be directed in the direction of one of the ears of the user, with the distance between the shoulder and the ear being, for example, 8 inches. More than 75% of the power of the audio signals generated by the emitting surface of the directional speaker can, in effect, be confined in a cone. The tip of the cone is at the speaker, and the mouth of the cone is at the location of the user's ear. The diameter of the mouth of the cone, or the diameter of the cone in the vicinity of the ear, is less than about 4 inches.

In another embodiment, the directional speaker can be made of a bimorph piezoelectric transducer. The transducer can have a cone of about 1 cm in diameter. In yet another embodiment, the directional speaker can be a magnetic transducer. In a further embodiment, the directional speaker does not generate ultrasonic signals, but generates audio signals directly; and the speaker includes, for example, a physical horn or cone to direct the audio signals.

In yet another embodiment, the power output from the directional speaker is increased by increasing the transformation efficiency (e.g., demodulation or mixing efficiency) of the ultrasonic signals. According to the Berktay's formula, as disclosed, for example, in "Possible exploitation of Non-Linear Acoustics in Underwater Transmitting Applications," by H. O. Berktay, in J. Sound Vib. Vol. 2 (4):435-461 (1965), which is hereby incorporated by reference, output audio power is proportional to the coefficient of non-linearity of the mixing or demodulation medium. One approach to increase the efficiency is to have at least a portion of the transformation performed in a medium other than air.

Figure 3:
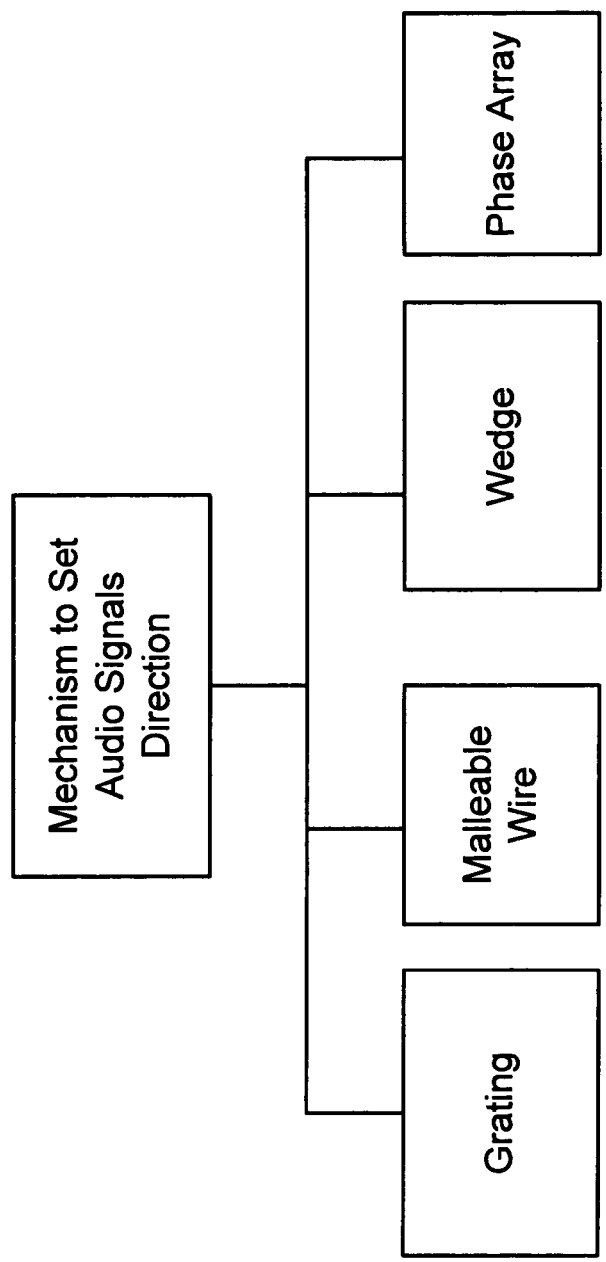
FIG. 3 shows examples of mechanisms to set the direction of audio signals of the present invention.

As explained, in one embodiment, based on parametric acoustic techniques, directional audio signals can be generated. FIG. 3 shows examples of mechanisms to direct the ultrasonic signals. They represent different approaches, which can utilize, for example, a grating, a malleable wire, or a wedge.

Figure 4A:
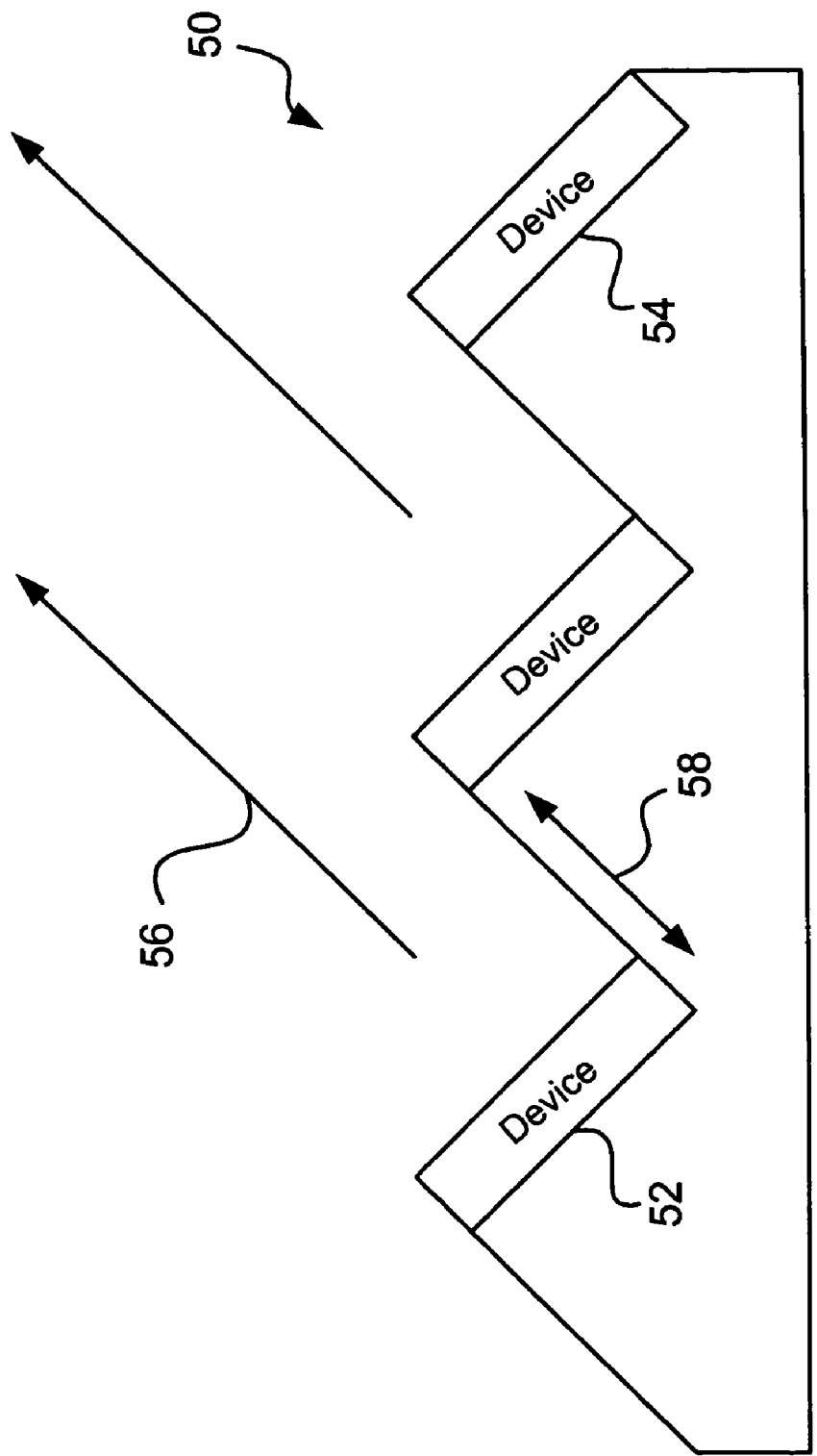
FIG. 4A shows one embodiment of a blazed grating for the present invention.

FIG. 4A shows one embodiment of a directional speaker 50 having a blazed grating. The speaker 50 is, for example, suitable for use as the directional speaker 16. Each emitting device, such as 52 and 54, of the speaker 50 can be a piezoelectric device or another type of speaker device located on a step of the grating. In one embodiment, the sum of all of the emitting surfaces of the emitting devices can have a dimension in the order of a few wavelengths of the ultrasonic signals.

In another embodiment, each of the emitting devices can be driven by a replica of the ultrasonic signals with an appropriate delay to cause constructive interference of the emitted waves at the blazing normal 56, which is the direction orthogonal to grating. This is similar to the beam steering operation of a phase array, and can be implemented by a delay matrix. The delay between adjacent emitting surfaces can be approximately h/c, with the height of each step being h. One approach to simplify signal processing is to arrange the height of each grating step to be an integral multiple of the ultrasonic or carrier wavelength, and all the emitting devices can be driven by the same ultrasonic signals.

Based on the grating structure, the array direction of the virtual audio sources can be the blazing normal 56. In other words, the structure of the steps can set the propagation direction of the audio signals. In the example shown in FIG. 4A, there are three emitting devices or speaker devices, one on each step. The total emitting surfaces are the sum of the emitting surfaces of the three devices. The propagation direction is approximately 45 degrees from the horizontal plane. The thickness of each speaker device can be less than half the wavelength of the ultrasonic waves. If the frequency of the ultrasonic waves is 40 kHz, the thickness can be about 4 mm.

Another approach to direct the audio signals to specific directions is to position a directional speaker of the present invention at the end of a malleable wire. The user can bend the wire to adjust the direction of propagation of the audio signals. For example, if the speaker is placed on the shoulder of a user, the user can bend the wire such that the ultrasonic signals produced by the speaker are directed towards the ear adjacent to the shoulder of the user.

Figure 4B:
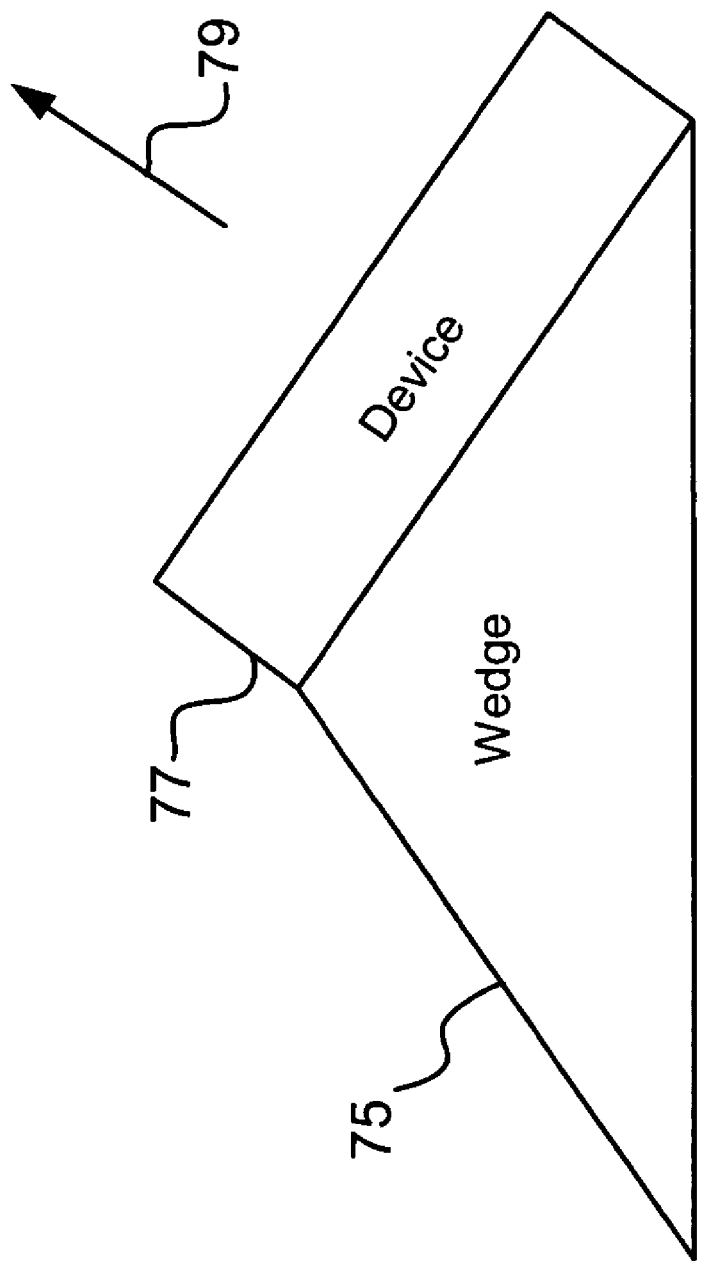
FIG. 4B shows an example of a wedge to direct the propagation angle of audio signals for the present invention.

Still another approach is to position the speaker device on a wedge. FIG. 4B shows an example of a wedge 75 with a speaker device 77. The angle of the wedge from the horizontal can be about 40 degrees. This sets the propagation direction 79 of the audio signals to be about 50 degrees from the horizon.

Figure 5:
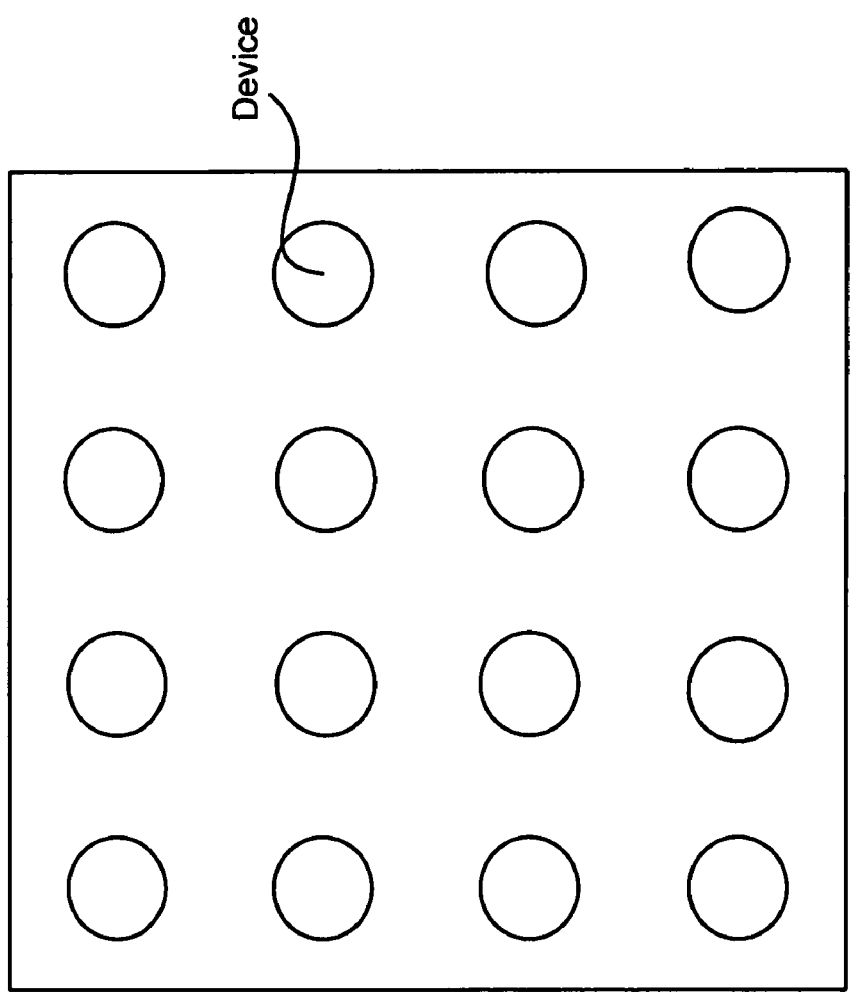
FIG. 5 shows an example of a steerable phase array of devices to generate the directional audio signals in accordance with the present invention.

In one embodiment, the ultrasonic signals are generated by a steerable phase array of individual devices, as illustrated, for example, in FIG. 5. They generate the directional signals by constructive interference of the devices. The signal beam is steerable by changing the relative phases among the array of devices.

One way to change the phases in one direction is to use a one-dimensional array of shift registers. Each register shifts or delays the ultrasonic signals by the same amount. This array can steer the beam by changing the clock frequency of the shift registers. These can be known as "x" shift registers. To steer the beam independently also in an orthogonal direction, one approach is to have a second set of shift registers controlled by a second variable rate clock. This second set of registers, known as "y" shift registers, is separated into a number of subsets of registers. Each subset can be an array of shift registers and each array is connected to one "x" shift register. The beam can be steered in the orthogonal direction by changing the frequency of the second variable rate clock.

For example, as shown in FIG. 5, the acoustic phase array is a 4 by 4 array of speaker devices. The devices in the acoustic phase array are the same. For example, each can be a bimorph device or transmitter of 7 mm in diameter. The overall size of the array can be around 2.8 cm by 2.8 cm. The carrier frequency can be set to 100 kHz. Each bimorph is driven at less than 0.1 W. The array is planar but each bimorph is pointed at the ear, such as at about 45 degrees to the array normal. The FWHM main lobe of each individual bimorph is about 0.5 radian.

There can be 4 "x" shift registers. Each "x" shift register can be connected to an array of 4 "y" shift registers to create a 4 by 4 array of shift registers. The clocks can be running at approximately 10 MHz (100 ns per shift). The ultrasonic signals can be transmitted in digital format and delayed by the shift registers at the specified amount.

Assuming the distance of the array from an ear is approximately 20 cm, the main lobe of each array device covers an area of roughly 10 cm×10 cm around the ear. As the head can move over an area of 10 cm×10 cm, the beam can be steerable roughly by a phase of 0.5 radian over each direction. This is equivalent to a maximum relative time delay of 40 us across one direction of the phase array, or 5 us of delay per device.

For a n by n array, the ultrasonic beam from each array element interferes with each other to produce a final beam that is 1/n narrower in beam width. In the above example, n is equal to 4, and the beam shape of the phase array is narrowed by a factor of 4 in each direction. That is, the FWHM is less than 8 degrees, covering an area of roughly 2.8 cm×2.8 cm around the ear.

With power focused into a smaller area, the power requirement is reduced by a factor of $1/n^2$, significantly improving power efficiency. In one embodiment, the above array can give the acoustic power of over 90 dB SPL.

Instead of using the bimorph devices, the above example can use an array of piezoelectric thin film devices.

In one embodiment, the interface unit can also include a pattern recognition device that identifies and locates the ear, or the ear canal. Then, if the ear or the canal can be identified, the beam is steered more accurately to the opening of the ear canal. Based on closed loop control, the propagation direction of the ultrasonic signals can be steered by the results of the pattern recognition approach.

One pattern recognition approach is based on thermal mapping to identify the entrance to the ear canal. Thermal mapping can be through infrared sensors. Another pattern recognition approach is based on a pulsed-infrared LED, and a reticon or CCD array for detection. The reticon or CCD array can have a broadband interference filter on top to filter light, which can be a piece of glass with coating.

Note that if the system cannot identify the location of the ear or the ear canal, the system can expand the cone, or decrease its directivity. For example, all array elements can emit the same ultrasonic signals, without delay, but with the frequency decreased.

Privacy is often a concern for users of cell phones. Unlike music or video players where users passively receive information or entertainment, with cell phones, there is a two-way communication. In most circumstances, cell phone users have gotten accustomed to people hearing what they have to say. At least, they can control or adjust their part of the communication. However, cell phone users typically do not want others to be aware of their entire dialogue. Hence, for many applications, at least the voice output portion of the cell phone should provide some level of privacy. With the directional speaker as discussed herein, the audio signals are directional, and thus the wireless communication system provides certain degree of privacy protection.

Figure 6:
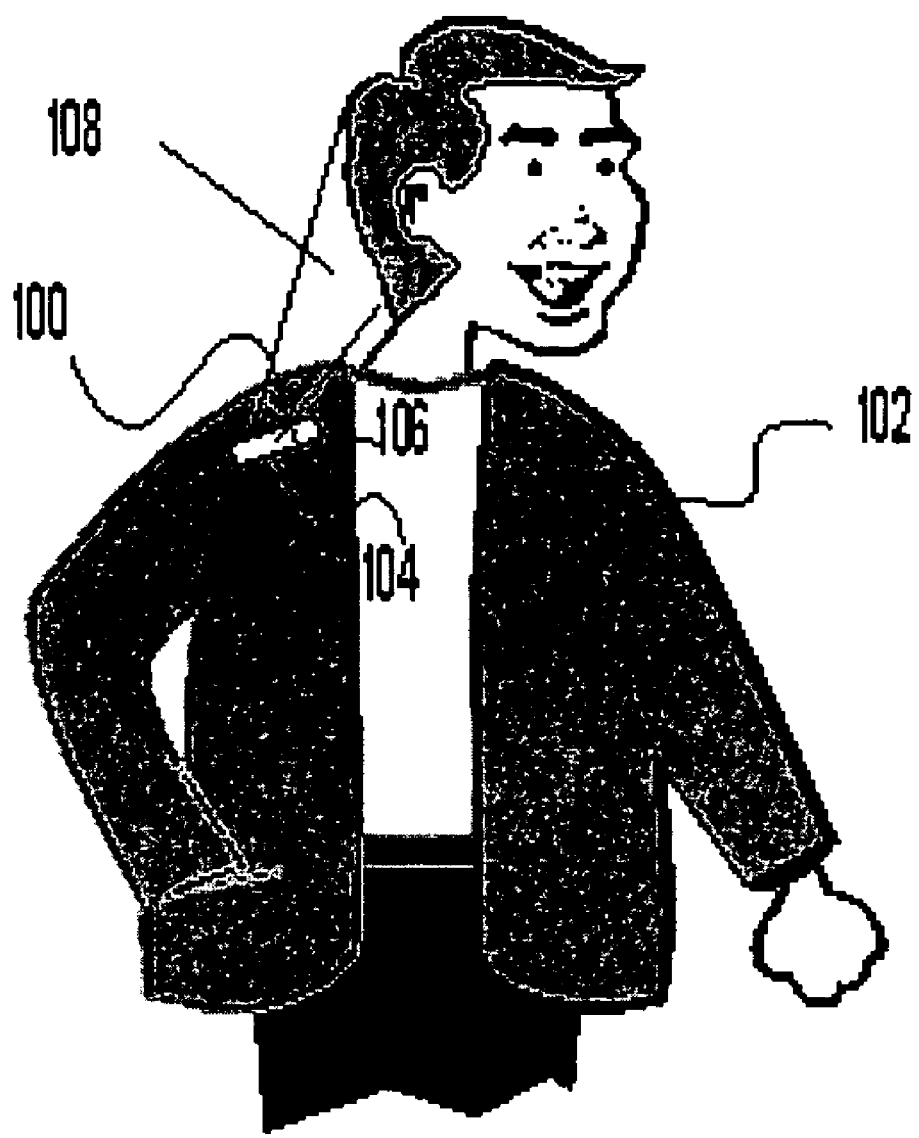
FIG. 6 shows one example of an interface unit attached to a piece of clothing of a user in accordance with the present invention.

FIG. 6 shows one example of the interface unit 100 attached to a jacket 102 of the user. The interface unit 100 includes a directional speaker 104 and a microphone 106. The directional speaker 104 emits ultrasonic signals in the general direction towards an ear of the user. The ultrasonic signals are transformed by mixing or demodulating in the air between the speaker and ear. The directional ultrasonic signals confine most of the audio energy within a cone 108 that is pointed towards the ear of the user. The surface area of the cone 108 when it reaches the head of the user can be tailored to be smaller than the head of the user. Hence, the directional ultrasonic signals are able to provide certain degree of privacy protection.

In one embodiment, there is one or more additional speaker devices provided within, proximate to, or around the directional speaker. The user's head can scatter a portion of the received audio signals. Others in the vicinity of the user may be able to pick up these scattered signals. The additional speaker devices, which can be piezoelectric devices, transmit random signals to interfere or corrupt the scattered signals or other signals that may be emitted outside the cone 108 of the directional signals to reduce the chance of others comprehending the scattered signals.

Figure 7:
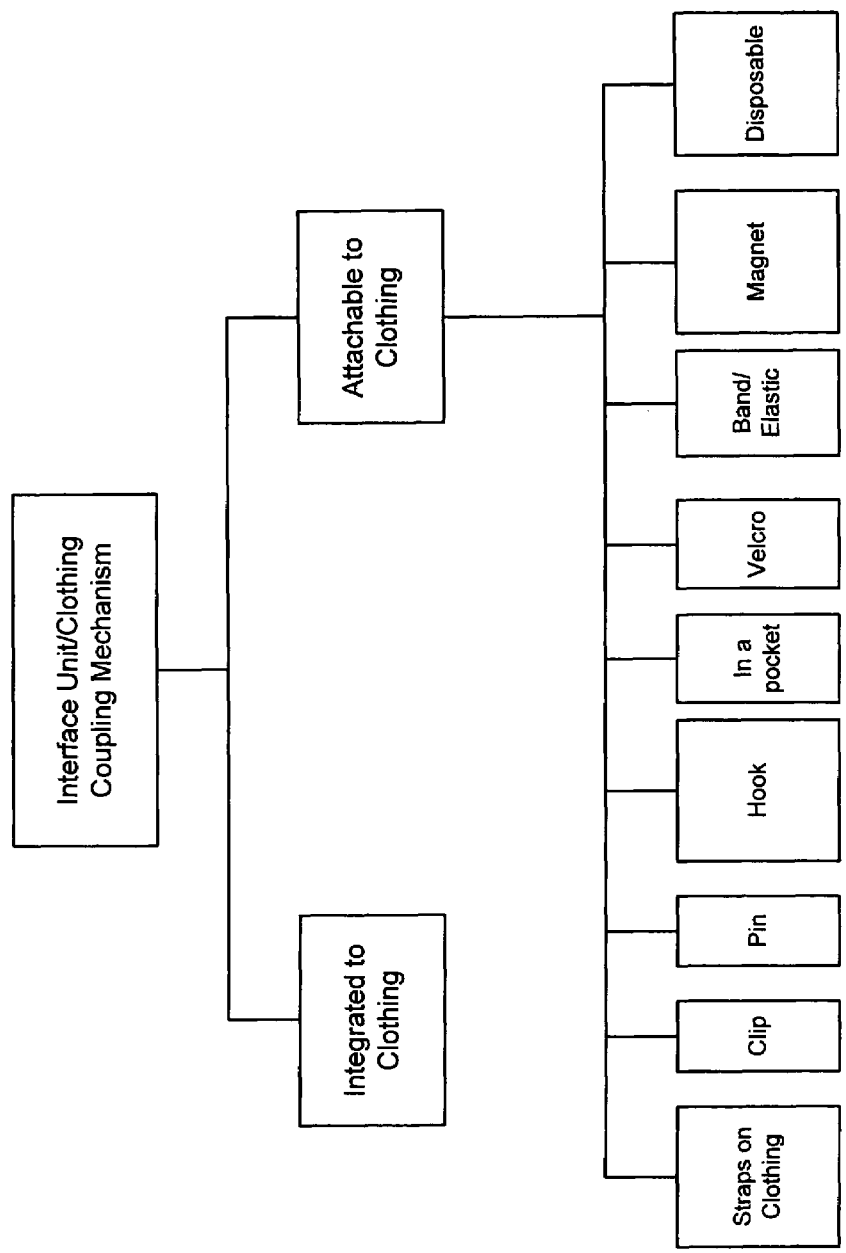
FIG. 7 shows examples of mechanisms to couple the interface unit to a piece of clothing in accordance with the present invention.

FIG. 7 shows examples of mechanisms to couple an interface unit to a piece of clothing. For example, the interface unit can be integrated into a user's clothing, such as located between the outer surface of the clothing and its inner lining. To receive power or other information from the outside, the interface unit can have an electrical protrusion from the inside of the clothing.

Instead of integrated into the clothing, in another embodiment, the interface unit can be attachable to the user's clothing. For example, a user can attach the interface unit to his clothing, and then turn it on. Once attached, the unit can be operated hands-free. The interface unit can be attached to a strap on the clothing, such as the shoulder strap of a jacket. The attachment can be through a clip, a pin or a hook. There can be a small pocket, such as at the collar bone area or the shoulder of the clothing, with a mechanism (e.g., a button) to close the opening of the pocket. The interface unit can be located in the pocket. In another example, a fastener can be on both the interface unit and the clothing for attachment purposes. In one example, the fastener can use hooks and loops (e.g., VELCRO brand fasteners). The interface unit can also be attached by a band, which can be elastic (e.g., an elastic armband). Or, the interface unit can be hanging from the neck of the user with a piece of string, like an ornamental design on a necklace. In yet another example, the interface unit can have a magnet, which can be magnetically attached to a magnet on the clothing. Note that one or more of these mechanisms can be combined to further secure the attachment. In yet another example, the interface unit can be disposable. For example, the interface unit could be disposed of once it runs out of power.

Figure 8:
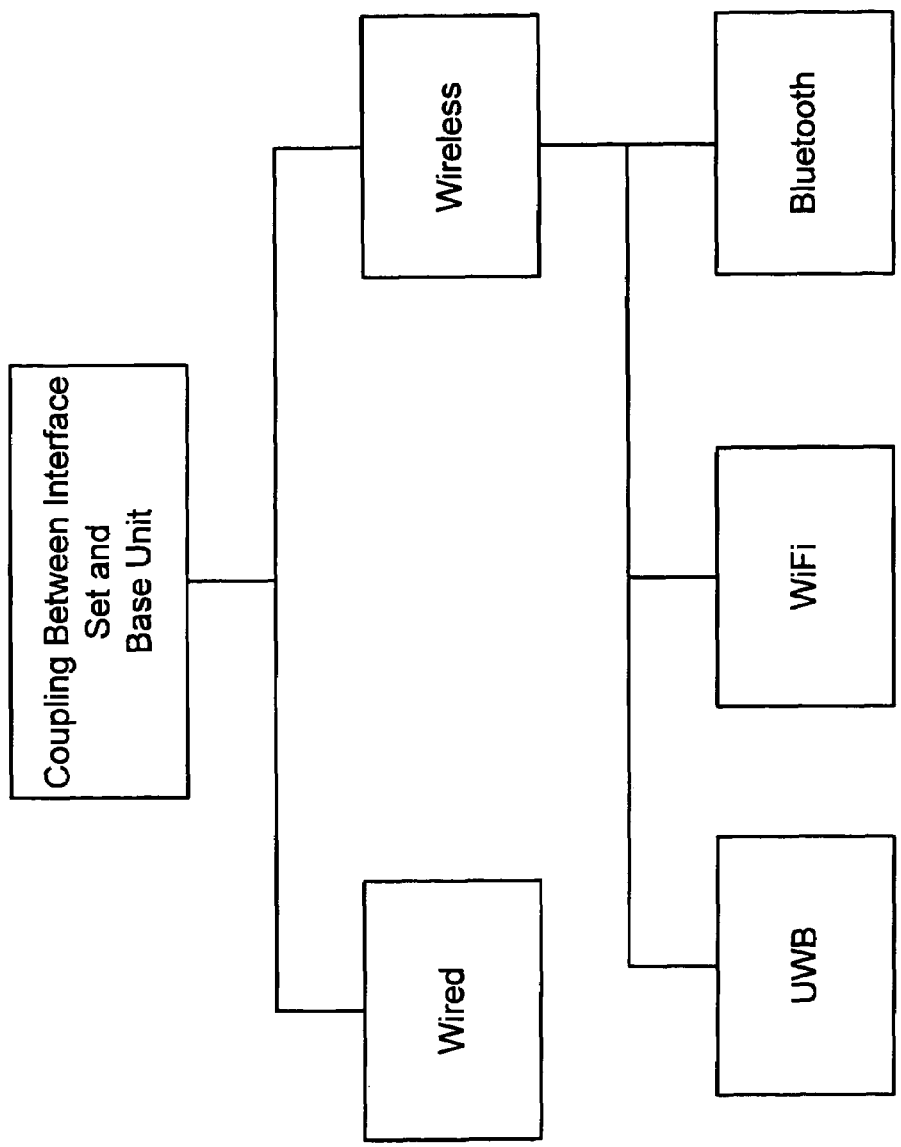
FIG. 8 shows examples of different coupling techniques between the interface unit and the base unit in the present invention.

Regarding the coupling between the interface unit and the base unit, FIG. 8 shows examples of a number of coupling techniques. The interface unit may be coupled wirelessly or tethered to the base unit through a wire. In the wireless embodiment, the interface unit may be coupled through Bluetooth, WiFi, Ultrawideband (UWB) or other wireless network/protocol.

Figure 9:
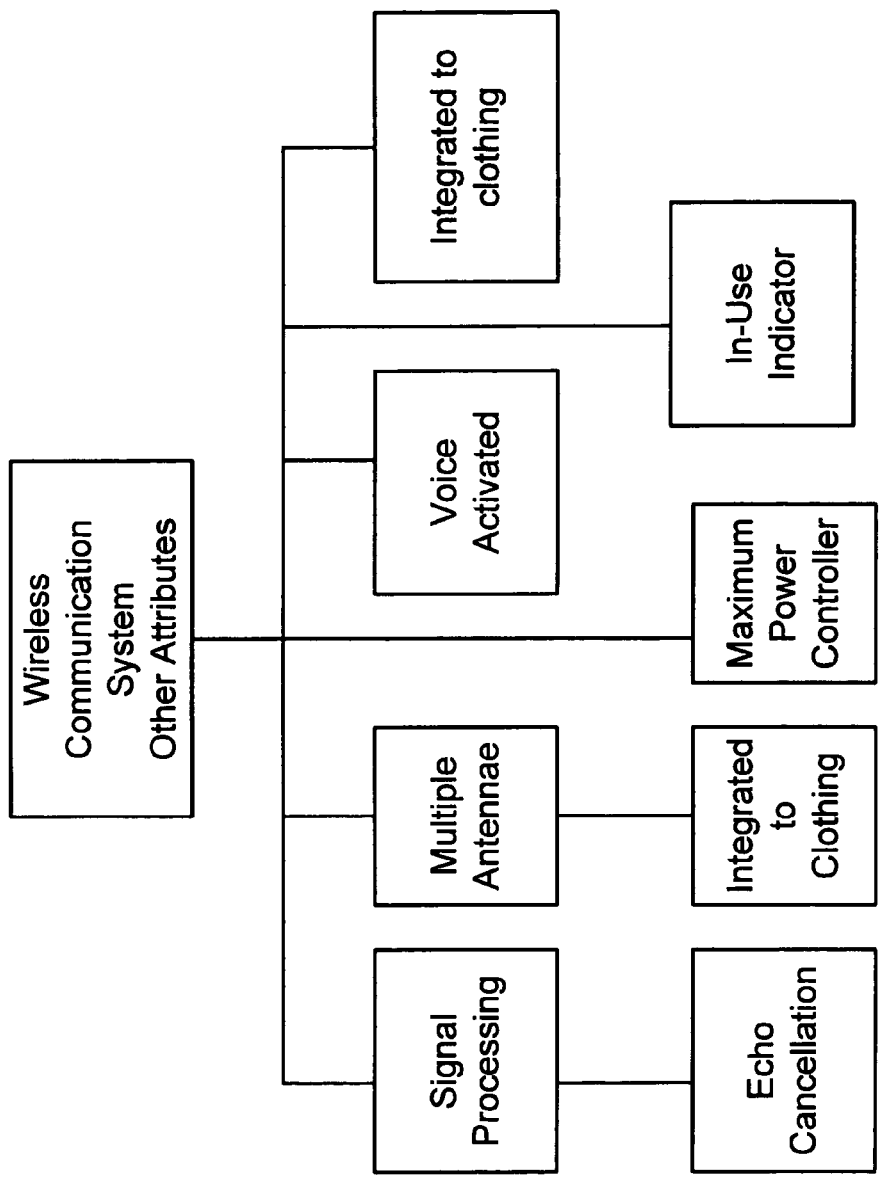
FIG. 9 shows examples of additional attributes of the wireless communication system in the present invention.

FIG. 9 shows examples of additional attributes of the wireless communication system of the present invention. The system can include additional signal processing techniques. Typically, single-side band (SSB) or lower-side band (LSB) modulation can be used with or without compensation for fidelity reproduction. If compensation is used, a processor (e.g., digital signal processor) can be deployed based on known techniques. Other components/functions can also be integrated with the processor. This can be local oscillation for down or up converting and impedance matching circuitry. Echo cancellation techniques may also be included in the circuitry. However, since the speaker is directional, the echo cancellation circuitry may not be necessary. These other functions can also be performed by software (e.g., firmware or microcode) executed by the processor.

The base unit can have one or more antennae to communicate with base stations or other wireless devices. Additional antennae can improve antenna efficiency. In the case where the interface unit wirelessly couples to the base unit, the antenna on the base unit can also be used to communicate with the interface unit. In this situation, the interface unit may also have more than one antenna.

The antenna can be integrated to the clothing. For example, the antenna and the base unit can both be integrated to the clothing. The antenna can be located at the back of the clothing.

The system can have a maximum power controller that controls the maximum amount of power delivered from the interface unit. For example, average output audio power can be set to be around 60 dB, and the maximum power controller limits the maximum output power to be below 70 dB. In one embodiment, this maximum power is in the interface unit and is adjustable.

The wireless communication system may be voice activated. For example, a user can enter, for example, phone numbers using voice commands. Information, such as phone numbers, can also be entered into a separate computer and then downloaded to the communication system. The user can then use voice commands to make connections to other phones.

The wireless communication system can have an in-use indicator. For example, if the system is in operation as a cell phone, a light source (e.g., a light-emitting diode) at the interface unit can operate as an in-use indicator. In one implementation, the light source can flash or blink to indicate that the system is in-use. The in-use indicator allows others to be aware that the user is, for example, on the phone.

In yet another embodiment, the base unit of the wireless communication system can also be integrated to the piece of clothing. The base unit can have a data port to exchange information and a power plug to receive power. Such port or ports can protrude from the clothing.

Figure 10:
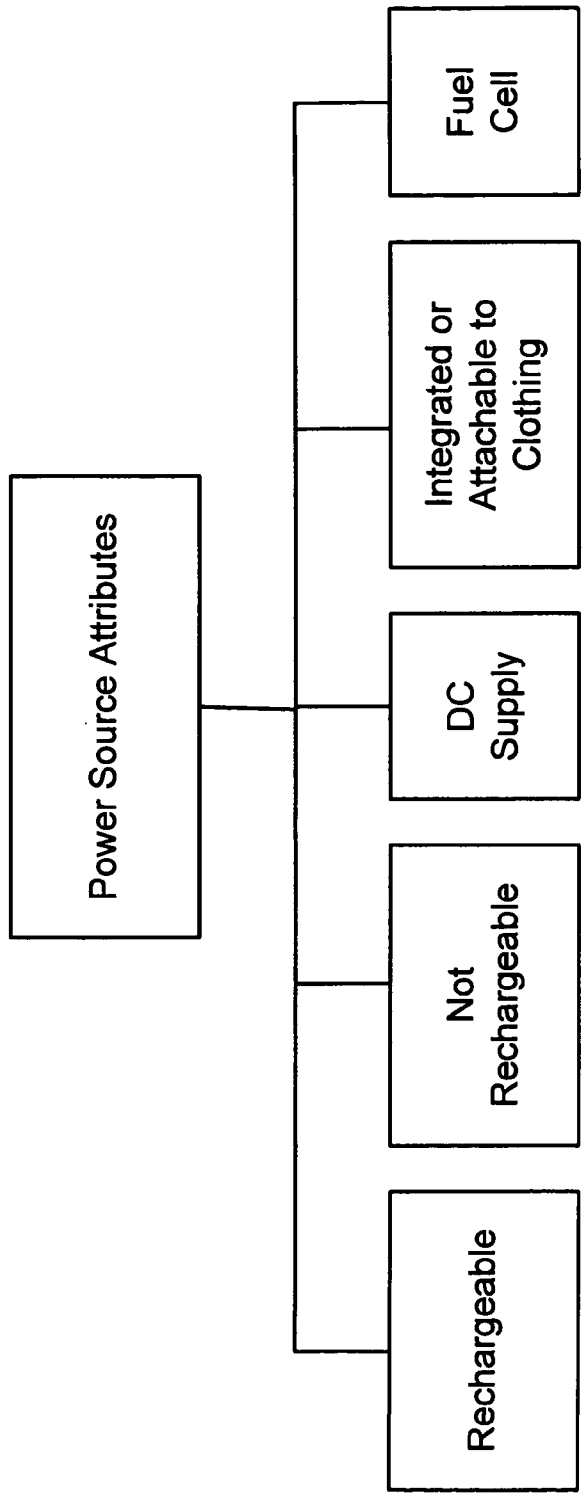
FIG. 10 shows examples of attributes of a power source for use with the present invention.

FIG. 10 shows examples of attributes of the power source. The power source may be a rechargeable battery or a non-rechargeable battery. As an example, a bimorph piezoelectric device, such as AT/R40-12P from Nicera, Nippon Ceramic Co., Ltd., can be used as a speaker device to form the speaker. It has a resistance of 1,000 ohms. Its power dissipation can be in the milliwatt range. A coin-type battery that can store a few hundred mAHours of energy has sufficient power to run the unit for a limited duration of time. Other types of batteries are also applicable.

The power source can be from a DC supply. The power source can be attachable, or integrated or embedded in a piece of clothing worn by the user. The power source can be a rechargeable battery. In one embodiment, for a rechargeable battery, it can be integrated in the piece of clothing, with its charging port exposed. The user can charge the battery on the road. For example, if the user is driving, the user can use a cigarette-lighter type charger to recharge the battery. In yet another embodiment, the power source is a fuel cell. The cell can be a cartridge of fuel, such methanol.

Figure 11A:
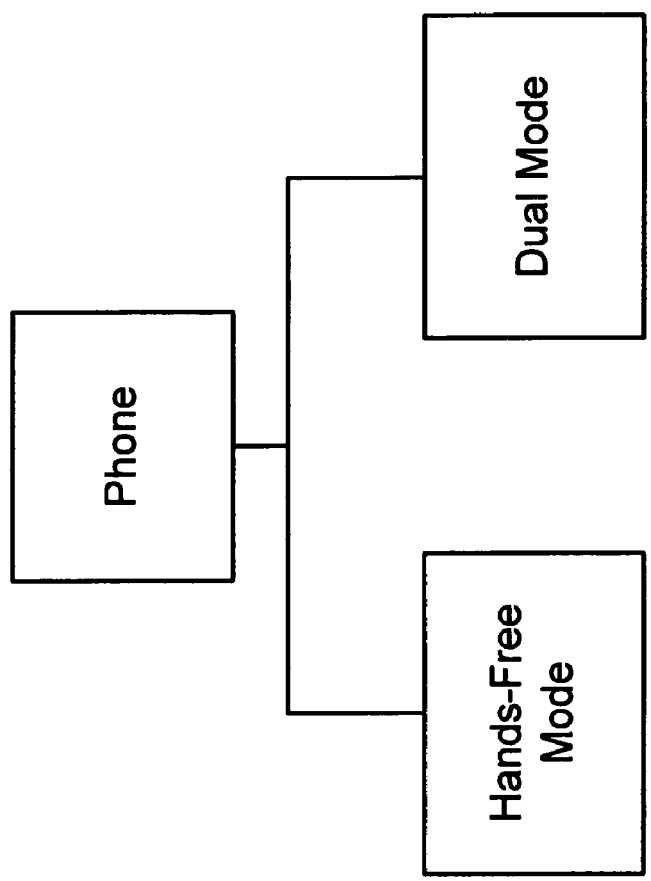
FIG. 11A shows the phone being a hands-free or a normal mode phone according to one embodiment of the present invention.

A number of embodiments have been described where the wireless communication system is a phone, particularly a cell phone that can be operated hands-free. In one embodiment, such can be considered a hands-free mode phone. FIG. 11A shows one embodiment where the phone can alternatively be a dual-mode phone. In a normal-mode phone, the audio signals are produced directly from a speaker integral with the phone (e.g., within its housing). Such a speaker is normally substantially non-directional (i.e., the speaker does not generate audio signals through transforming ultrasonic signals in air). In a dual mode phone, one mode is the hands-free mode phone as described above, and the other mode is the normal-mode phone.

Figure 11B:
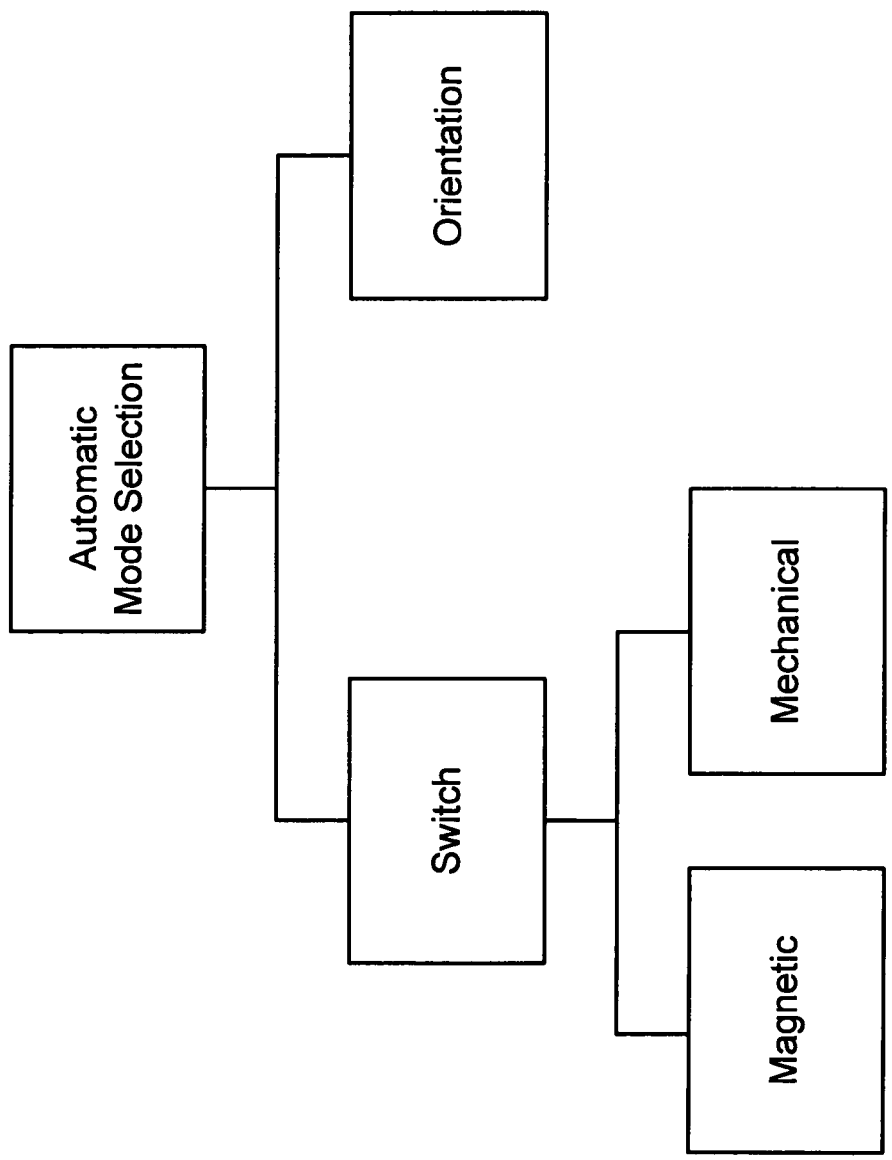
FIG. 11B shows examples of different techniques to automatically select the mode of a dual mode phone in accordance with the present invention.

The mode selection process can be set by a switch on the phone. In one embodiment, mode selection can be automatic. FIG. 11B shows examples of different techniques to automatically select the mode of a dual mode phone. For example, if the phone is attached to the clothing, the directional speaker of the interface unit can be automatically activated, and the phone becomes the hands-free mode phone. In one embodiment, automatic activation can be achieved through a switch integrated to the phone. The switch can be a magnetically-activated switch. For example, when the interface unit is attached to clothing (for hands-free usage), a magnet or a piece of magnetizable material in the clothing can cause the phone to operate in the hands-free mode. When the phone is detached from clothing, the magnetically-activated switch can cause the phone to operate as a normal-mode phone. In another example, the switch can be mechanical. For example, an on/off button on the unit can be mechanically activated if the unit is attached. This can be done, for example, by a lever such that when the unit is attached, the lever will be automatically pressed. In yet another example, activation can be based on orientation. If the interface unit is substantially in a horizontal orientation (e.g., within 30 degrees from the horizontal), the phone will operate in the hands-free mode. However, if the unit is substantially in a vertical orientation (e.g., within 45 degrees from the vertical), the phone will operate as a normal-mode phone. A gyro in the interface unit can be used to determine the orientation of the interface unit.

Figure 12:
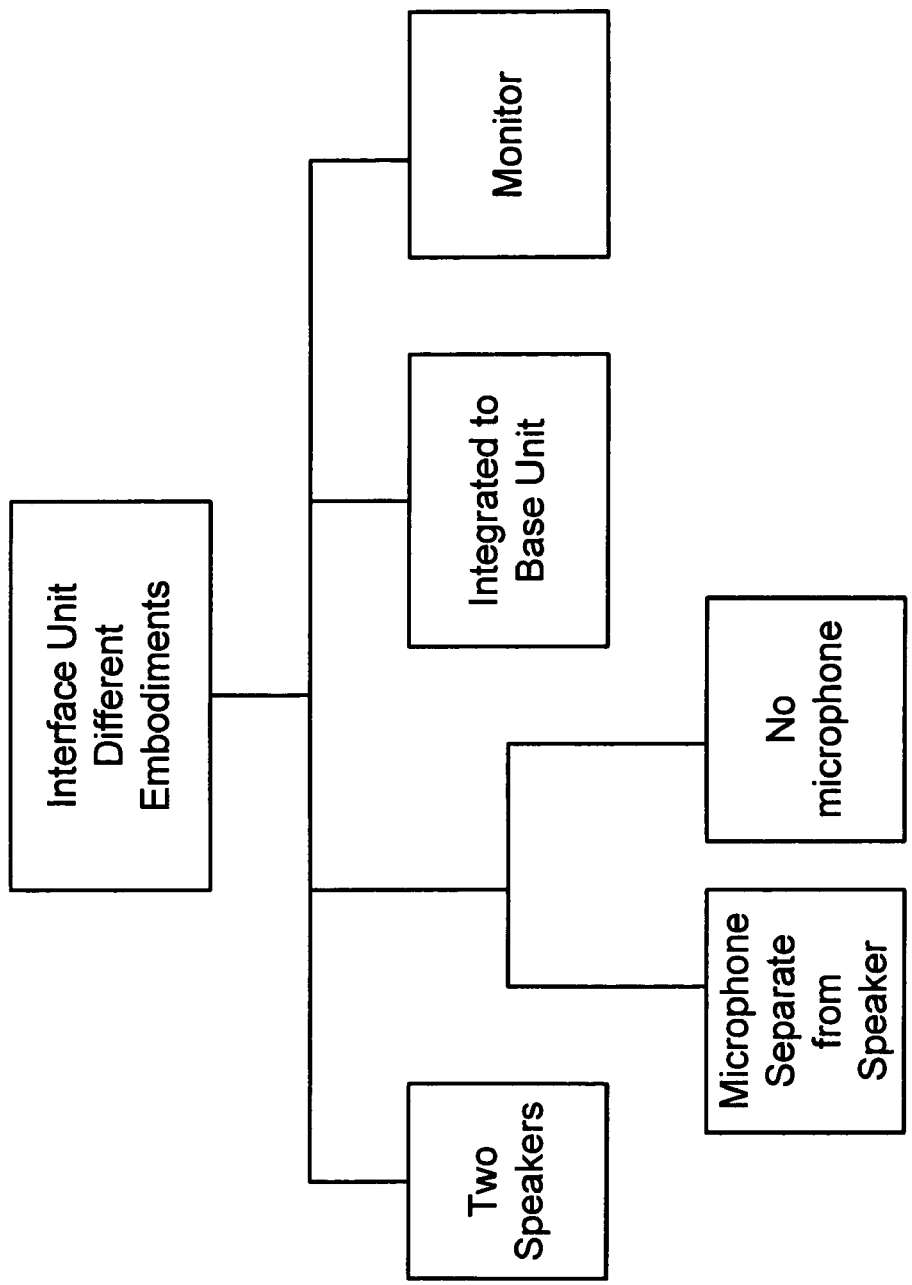
FIG. 12 shows examples of different embodiments of an interface unit of the present invention.
Figure 13:
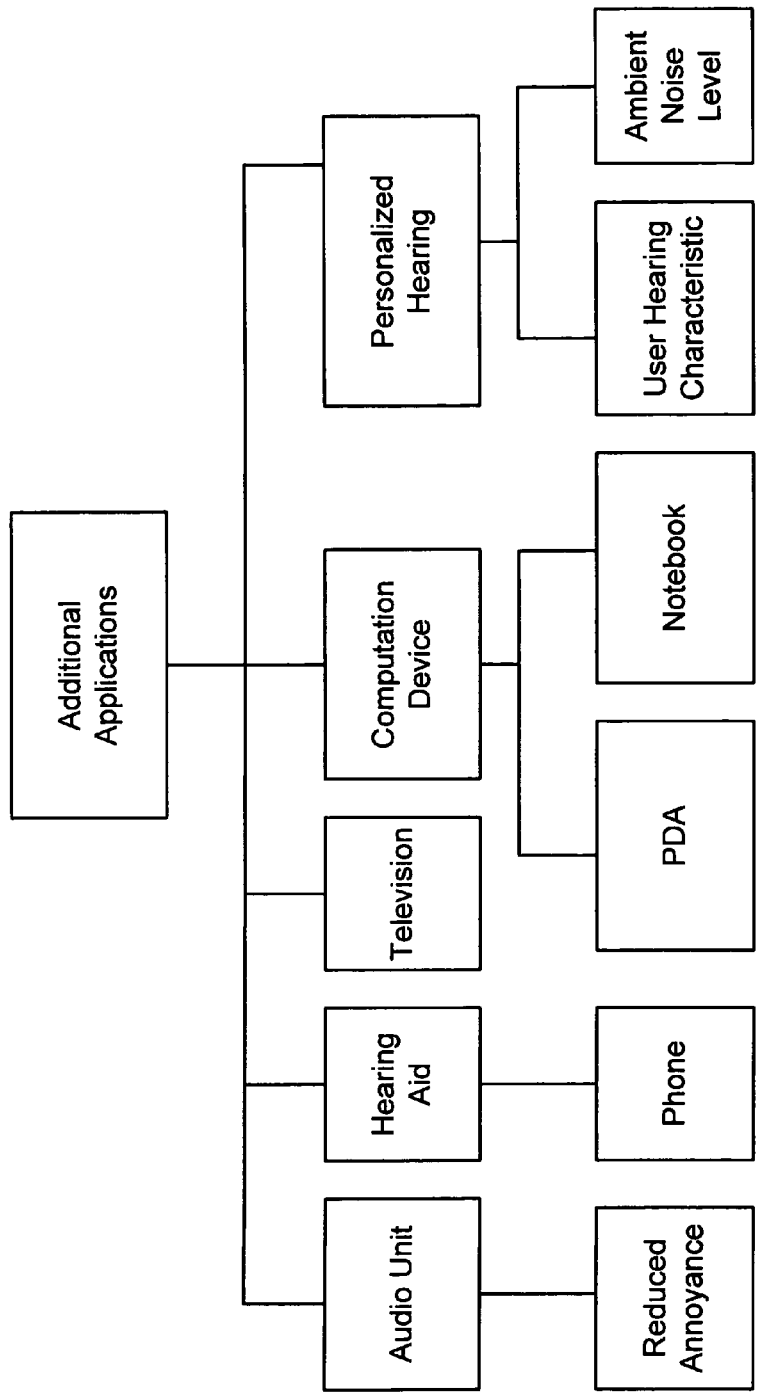
FIG. 13 shows examples of additional applications for the present invention.

A number of embodiments have been described where the wireless communication system is a phone with a directional speaker and a microphone. However, the present invention can be applied to other areas. FIG. 12 shows examples of other embodiments of the interface unit, and FIG. 13 shows examples of additional applications.

The interface unit can have two speakers, each propagating its directional audio signals towards one of the ears of the user. For example, one speaker can be on one shoulder of the user, and the other speaker on the other shoulder. The two speakers can provide a stereo effect for the user.

A number of embodiments have been described where the microphone and the speaker are integrated together in a single package. In another embodiment, the microphone can be a separate component and can be attached to the clothing as well. For wired connections, the wires from the base unit can connect to the speaker and at least one wire can split off and connect to the microphone at a location close to the head of the user.

The interface unit does not need to include a microphone. Such a wireless communication system can be used as an audio unit, such as a MP3 player, a CD player or a radio. Such wireless communication systems can be considered one-way communication systems.

In another embodiment, the interface unit can be used as the audio output, such as for a stereo system, television or a video game player. For example, the user can be playing a video game. Instead of having the audio signals transmitted by a normal speaker, the audio signals, or a representation of the audio signals, are transmitted wirelessly to a base unit or an interface unit. Then, the user can hear the audio signals in a directional manner, reducing the chance of annoying or disturbing people in his immediate environment.

In another embodiment, a wireless communication system can, for example, be used as a hearing aid. The microphone in the interface unit can capture audio signals in its vicinity, and the directional speaker can re-transmit the captured audio signals to tho user. The microphone can also be a directional microphone that is more sensitive to audio signals in selective directions, such as in front of the user. In this application, the speaker output volume is typically higher. For example, one approach is to drive a bimorph device at higher voltages. The hearing aid can selectively amplify different audio frequencies by different amounts based on user preference or user hearing characteristics. In other words, the audio output can be tailored to the hearing of the user. Different embodiments on hearing enhancement through personalizing or tailoring to the hearing of the user have been described in the U.S. patent application Ser. No. 10/826,527, filed concurrently, and entitled, "Directional Hearing Enhancement Systems", which is hereby incorporated herein by reference.

In one embodiment, the wireless communication system can function both as a hearing aid and a cell phone. When there are no incoming calls, the system functions as a hearing aid. On the other hand, when there is an incoming call, instead of capturing audio signals in its vicinity, the system transmits the incoming call through the directional speaker to be received by the user. In another embodiment, the base unit and the interface unit are integrated together in a package, which again can be attached to the clothing by techniques previously described for the interface unit.

In yet another embodiment, an interface unit can include a monitor or a display. A user can watch television or video signals in public, again with reduced possibility of disturbing people in the immediate surroundings because the audio signals are directional. For wireless applications, video signals can be transmitted from the base unit to the interface unit through UWB signals.

The base unit can also include the capability to serve as a computation system, such as in a personal digital assistant (PDA) or a notebook computer. For example, as a user is working on the computation system for various tasks, the user can simultaneously communicate with another person in a hands-free manner using the interface unit, without the need to take her hands off the computation system. Data generated by a software application the user is working on using the computation system can be transmitted digitally with the voice signals to a remote device (e.g., another base station or unit). In this embodiment, the directional speaker does not have to be integrated or attached to the clothing of the user. Instead, the speaker can be integrated or attached to the computation system, and the computation can function as a cell phone. Directional audio signals from the phone call can be generated for the user while the user is still able to manipulate the computation system with both of his hands. The user can simultaneously make phone calls and use the computation system. In yet another approach for this embodiment, the computation system is also enabled to be connected wirelessly to a local area network, such as to a WiFi or WLAN network, which allows high-speed data as well as voice communication with the network. For example, the user can make voice over IP calls. In one embodiment, the high-speed data as well as voice communication permits signals to be transmitted wirelessly at frequencies beyond 1 GHz.

In yet another embodiment, the wireless communication system can be a personalized wireless communication system. The audio signals can be personalized to the hearing characteristics of the user of the system. The personalization process can be done periodically, such as once every year, similar to periodic re-calibration. Such re-calibration can be done by another device, and the results can be stored in a memory device. The memory device can be a removable media card, which can be inserted into the wireless communication system to personalize the amplification characteristics of the directional speaker as a function of frequency. The system can also include an equalizer that allows the user to personalize the amplitude of the speaker audio signals as a function of frequency.

The system can also be personalized based on the noise level in the vicinity of the user. The device can sense the noise level in its immediate vicinity and change the amplitude characteristics of the audio signals as a function of noise level.

The form factor of the interface unit can be quite compact. In one embodiment, it is rectangular in shape. For example, it can have a width of about "x", a length of about "2x", and a thickness that is less than "x". "X" can be 1.5 inches, or less than 3 inches. In another example, the interface unit has a thickness of less than 1 inch. In yet another example, the interface unit does not have to be flat. It can have a curvature to conform to the physical profile of the user.

A number of embodiments have been described with the speaker being directional. In one embodiment, a speaker is considered directional if the FWHM of its ultrasonic signals is less than about 1 radian or around 57 degrees. In another embodiment, a speaker is considered directional if the FWHM of its ultrasonic signals is less than about 30 degrees. In yet another embodiment, a speaker is transmitting from, such as, the shoulder of the user. The speaker is considered directional if in the vicinity of the user's ear or in the vicinity 6-8 inches away from the speaker, 75% of the power of its audio signals is within an area of less than 50 square inches. In a further embodiment, a speaker is considered directional if in the vicinity of the ear or in the vicinity a number of inches, such as 8 inches, away from the speaker, 75% of the power of its audio signals is within an area of less than 20 square inches. In yet a further embodiment, a speaker is considered directional if in the vicinity of the ear or in the vicinity a number of inches, such as 8 inches, away from the speaker, 75% of the power of its audio signals is within an area of less than 13 square inches.

Also, referring back to FIG. 6, in one embodiment, a speaker can be considered a directional speaker if most of the power of its audio signals is propagating in one general direction, confined within a cone, such as the cone 108 in FIG. 6, and the angle between the two sides or edges of the cone, such as shown in FIG. 6, is less than 60 degrees. In another embodiment, the angle between the two sides or edges of the cone is less than 45 degrees.

In a number of embodiments described above, the directional speaker generates ultrasonic signals in the range of 40 kHz. One of the reasons to pick such a frequency is for power efficiency. However, to reduce leakage, cross talk or to enhance privacy, in other embodiments, the ultrasonic signals utilized can be between 200 kHz to 1 MHz. It can be generated by multilayer piezoelectric thin films, or other types of solid state devices. Since the carrier frequency is at a higher frequency range than 40 kHz, the absorption/ attenuation coefficient by air is considerably higher. For example, at 500 kHz, in one calculation, the attenuation coefficient $\alpha$ can be about 4.6, implying that the ultrasonic wave will be attenuated by $\exp(-\alpha^* z)$ or about 40 dB/m. As a result, the waves are more quickly attenuated, reducing the range of operation of the speaker in the propagation direction of the ultrasonic waves. On the other hand, privacy is enhanced and audible interference to others is reduced.

The 500 kHz embodiment can be useful in a confined environment, such as inside a car. The beam can emit from the dashboard towards the ceiling of the car. In one embodiment, there can be a reflector at the ceiling to reflect the beam to the desired direction or location. In another embodiment, the beam can be further confined in a cavity or waveguide, such as a tube, inside the car. The beam goes through some distance inside the cavity, such as 2 feet, before emitting into free space within the car, and then received by a person, without the need for a reflector.

A number of embodiments of directional speakers have also been described where the resultant propagation direction of the ultrasonic waves is not orthogonal to the horizontal, but at, for example, 45 degrees. The ultrasonic waves can be at an angle so that the main beam of the waves is approximately pointed at an ear of the user. In another embodiment, the propagation direction of the ultrasonic waves can be approximately orthogonal to the horizontal. Such a speaker does not have to be on a wedge or a step. It can be on a surface that is substantially parallel to the horizontal. For example, the speaker can be on the shoulder of a user, and the ultrasonic waves propagate upwards, instead of at an angle pointed at an ear of the user. If the ultrasonic power is sufficient, the waves would have sufficient acoustic power even when the speaker is not pointing exactly at the ear.

One approach to explain the sufficiency in acoustic power is that the ultrasonic speaker generates virtual sources in the direction of propagation. These virtual sources generate secondary acoustic signals in numerous directions, not just along the propagation direction. This is similar to the antenna pattern which gives non-zero intensity in numerous directions away from the direction of propagation. In one such embodiment, the acoustic power is calculated to be from 45 to 50 dB SPL if (a) the ultrasonic carrier frequency is 500 kHz; (b) the audio frequency is 1 kHz; (c) the emitter size of the speaker is 3 cm×3 cm; (d) the emitter power (peak) is 140 dB SPL; (e) the emitter is positioned at 10 to 15 cm away from the ear, such as located on the shoulder of the user; and (f) with the ultrasonic beam pointing upwards, not towards the ear, the center of the ultrasonic beam is about 2-5 cm away from the ear.

In one embodiment, the ultrasonic beam is considered directed towards the ear as long as any portion of the beam, or the cone of the beam, is immediately proximate to, such as within 7 cm of, the ear. The direction of the beam does not have to be pointed at the ear. It can even be orthogonal to the ear, such as propagating up from one's shoulder, substantially parallel to the face of the person.

In yet another embodiment, the emitting surface of the ultrasonic speaker does not have to be flat. It can be designed to be concave or convex to eventually create a diverging ultrasonic beam. For example, if the focal length of a convex surface is f, the power of the ultrasonic beam would be 6 dB down at a distance of f from the emitting surface. To illustrate numerically, if f is equal to 5 cm, then after 50 cm, the ultrasonic signal would be attenuated by 20 dB.

A number of embodiments have been described where a device is attachable to the clothing worn by a user. In one embodiment, attachable to the clothing worn by a user includes wearable by the user. For example, the user can wear a speaker on his neck, like a pendant on a necklace. This also would be considered as attachable to the clothing worn by the user. From another perspective, the necklace can be considered as the "clothing" worn by the user, and the device is attachable to the necklace.

One or more of the above-described embodiments can be combined. For example, two directional speakers can be positioned one on each side of a notebook computer. As the user is playing games on the notebook computer, the user can communicate with other players using the microphone on the notebook computer and the directional speakers, again without taking his hands off a keyboard or a game console. Since the speakers are directional, audio signals are more confined to be directed to the user in front of the notebook computer.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data, which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the invention. However, it will be understood by those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A wireless communication system for a being, comprising:
   a directional speaker attachable to a piece of clothing worn by the being;
   a microphone; and
   a base unit coupled to both the speaker and the microphone to allow the being to use the system to communicate wirelessly with another communication device,
   wherein signals emitted from the speaker can be directed towards at least one ear of the being from the worn position of the speaker,
   wherein the directional speaker generates ultrasonic signals, which are transformed into audio signals,
   wherein the directional speaker is configured to be attached to a portion of the piece of clothing, and to be intentionally spaced apart from the ears of the being, so that at least a portion of the ultrasonic signals is transformed into the audio signals via at least a portion of the medium in the space between the directional speaker and at least one of the ears of the being, and
   wherein the signals are directional to allow communication with enhanced privacy.

2. A wireless communication system as recited in claim 1 further comprising a power source that is at least partially integrated in the piece of clothing.

3. A wireless communication system as recited in claim 1 wherein the system includes another mode of operation that generates audio signals directly from the speaker.

4. A wireless communication system as recited in claim 1 wherein the speaker is selected from a group including: a device with a piezoelectric thin film, a device with a bimorph and a device with a magnetic transducer.

5. A wireless communication system as recited in claim 1 wherein the speaker and the microphone are integrated with the clothing.

6. A wireless communication system as recited in claim 1 wherein the speaker and the microphone couple to the base unit wirelessly.

7. A wireless communication system as recited in claim 1 further includes an indicator for providing an indication that the system is being used to communicate wirelessly with the another communication device.

8. A wireless communication system as recited in claim 1 further comprising another directional speaker attachable to the clothing with the two speakers creating stereo effects.

9. A wireless communication system as recited in claim 1 wherein the speaker, the microphone and the base unit are integrated into one package, which is attachable to the clothing.

10. A wireless communication system as recited in claim 1 wherein
    the base unit includes a display; and
    the base unit includes capability to allow it to function as a computation device.

11. A wireless communication system as recited in claim 1 wherein the signals can be personalized based on the hearing characteristics of the being.

12. A wireless communication system as recited in claim 1 wherein the signals can be personalized based on the sound level in the vicinity of the being.

13. A wireless communication device as recited in claim 1, wherein the directional speaker is configured to be attached to a portion of the piece of clothing that is in the vicinity of one of the shoulders of the user.

14. A wireless communication system for a being, comprising:
    a directional speaker attachable to a piece of clothing worn by the being;
    a microphone; and
    a base unit coupled to both the speaker and the microphone to allow the being to use the system to communicate wirelessly with another communication device,
    wherein signals emitted from the sneaker can be directed towards at least one ear of the being from the worn position of the speaker,
    wherein the signals are directional to allow communication with enhanced privacy,
    wherein the directional speaker generates ultrasonic signals, which are transformed into audio signals,
    wherein the system includes another mode of operation that generates audio signals directly from the speaker, and
    wherein the another mode of operation is deactivated when the speaker is attached to the clothing.

15. A portable computing system for a user, comprising:
    a directional speaker, which generates ultrasonic signals that are transformed to produce audio signals;
    a microphone;
    a display; and
    a computing device coupled to the speaker, the microphone and the display,
    wherein the user can use the system to communicate wirelessly with another communication device,
    wherein signals emitted from the speaker can be directed towards the user from the position the system is used,
    wherein the user can communicate with the another communication device in a hands-free manner,
    wherein the system is enabled for data as well as voice communication,
    wherein the signals emitted from the speaker are directional to allow communication with enhanced privacy, and
    wherein the volume of at least portion of the audio signals is automatically changed depending on the sound level in the vicinity of the system.

16. A wireless communication device,
    wherein the improvement comprises a directional speaker that can direct audio signals towards a user,
    wherein the directional speaker generates ultrasonic signals, which are transformed into audio signals,
    wherein the communication device includes another speaker that directly generates audio signals, without the need to be transformed from ultrasonic signals, and
    wherein the communication device can be controlled to switch from generating audio signals by the directional speaker, to generating audio signals by the another speaker.

17. A wireless communication device as recited in claim 16, wherein said wireless communication device is a personal digital assistant, a computer or a mobile telephone.

18. A wireless communication device as recited in claim 16, wherein said directional speaker is configured to be personalized to the user such that at least the volume of a portion of the audio signals is automatically changed depending on at least one hearing characteristic of the user.

19. A wireless communication device as recited in claim 16, wherein said wireless communication device includes a video display.

20. A wireless communication device as recited in claim 16, wherein said directional speaker directs the audio signals to the user's ear by emitting ultrasonic signals in a direction substantially parallel to the face of the user.

21. A wireless communication device as recited in claim 16, wherein the audio signals from the directional speaker can be steered.

22. A wireless communication device as recited in claim 16, wherein said directional speaker directs the audio signals to the user's ear by a physical horn forming part of said directional speaker.

23. A wireless communication device as recited in claim 16,
wherein said directional speaker directs the audio signal to the user's ear by confining the audio signals substantially within a virtual cone having an input end at said directional speaker and an output end at the vicinity of the user's ear, and
wherein the diameter of the virtual cone at the output end is less than 6 inches.

* * * * *

UNITED STATES PATENT AND TRADEMARK OFFICE
CERTIFICATE OF CORRECTION

PATENT NO. : 7,269,452 B2
APPLICATION NO. : 10/826529
DATED : September 11, 2007
INVENTOR(S) : Cheung et al.

It is certified that error appears in the above-identified patent and that said Letters Patent is hereby corrected as shown below:

COVER PAGE: On the Title Page, under item (56) References Cited, page 2,

"6,243,742 B1 6/2001 Hagersten et al." should be -- 6,243,472 6/2001, Bilan et al. --

Column 18, line 40 "least portion" should be -- least a portion --.

Signed and Sealed this

Sixth Day of October, 2009

David J. Kappos
*Director of the United States Patent and Trademark Office*